US012669773B2

(12) United States Patent
Abe

(10) Patent No.: US 12,669,773 B2
(45) Date of Patent: Jun. 30, 2026

(54) DEVELOPING CARTRIDGE INCLUDING FIRST FRAME SUPPORTING DEVELOPING ROLLER AND HAVING LOAD RECEIVING SURFACE, AND SECOND FRAME FIXED TO FIRST FRAME

(71) Applicant: BROTHER KOGYO KABUSHIKI KAISHA, Nagoya (JP)

(72) Inventor: Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/989,675

(22) Filed: Dec. 20, 2024

(65) Prior Publication Data

US 2025/0199459 A1 Jun. 19, 2025

Related U.S. Application Data

(63) Continuation of application No. 18/489,079, filed on Oct. 18, 2023, now Pat. No. 12,216,429.

(30) Foreign Application Priority Data

Nov. 28, 2022 (JP) ................................ 2022-189508

(51) Int. Cl.
*G03G 15/08* (2006.01)
*G03G 21/16* (2006.01)

(52) U.S. Cl.
CPC ..... *G03G 21/1647* (2013.01); *G03G 21/1676* (2013.01)

(58) Field of Classification Search
CPC ............ G03G 15/065; G03G 15/0863; G03G 21/1647; G03G 21/1676
(Continued)

(56) References Cited

U.S. PATENT DOCUMENTS 9,195,165 B2 11/2015 Iriyama et al.
11,003,107 B2 * 5/2021 Itabashi .............. G03G 15/065
(Continued)

FOREIGN PATENT DOCUMENTS

JP 2015-143749 A 8/2015
JP 2017-167522 A 9/2017
(Continued)

OTHER PUBLICATIONS

International Search Report and Written Opinion issued in corresponding International application No. PCT/JP2023/037551, Nov. 28, 2023.

*Primary Examiner* — Hoan H Tran
(74) *Attorney, Agent, or Firm* — Merchant & Gould P.C.

(57) ABSTRACT

A developing cartridge attachable to a drum cartridge includes: a developing roller; a casing including a first frame supporting the developing roller and a second frame fixed to the first frame; and a separation member movable in a first direction relative to the casing. The separation member includes: a separation shaft; and a first inclined surface positioned at one end portion in the first direction of the separation member. The first frame has a load receiving surface facing the separation shaft in a second direction crossing the first direction. The load receiving surface makes contact with the separation shaft to receive a load directed in the second direction from the separation shaft when the separation member moves in the first direction and the first inclined surface makes contact with the drum cartridge in a state where the developing cartridge is attached to the drum cartridge.

9 Claims, 18 Drawing Sheets

(58) Field of Classification Search
USPC .................................. 399/107, 110, 111, 262
See application file for complete search history.

(56) References Cited

U.S. PATENT DOCUMENTS

| | | | | |
|---|---|---|---|---|
| 11,333,996 | B2 * | 5/2022 | Kusuda | G03G 15/0863 |
| 11,454,901 | B2 | 9/2022 | Ao | |
| 2017/0261921 | A1 | 9/2017 | Kawamura et al. | |
| 2019/0302682 | A1 | 10/2019 | Wang et al. | |
| 2020/0103817 | A1 | 4/2020 | Wang et al. | |
| 2020/0301345 | A1 | 9/2020 | Suzuki | |
| 2021/0349421 | A1 | 11/2021 | Ooka | |

FOREIGN PATENT DOCUMENTS

| | | | | |
|---|---|---|---|---|
| JP | 2019-179128 | A | | 10/2019 |
| JP | 2020-056817 | A | | 4/2020 |
| JP | 2020-154204 | A | | 9/2020 |
| JP | 2020-166005 | A | | 10/2020 |
| JP | 2021089366 | A | * | 6/2021 |
| JP | 20211089366 | A | * | 6/2021 |

* cited by examiner

DEVELOPING CARTRIDGE INCLUDING FIRST FRAME SUPPORTING DEVELOPING ROLLER AND HAVING LOAD RECEIVING SURFACE, AND SECOND FRAME FIXED TO FIRST FRAME

REFERENCE TO RELATED APPLICATIONS

This application is a continuation of U.S. patent application Ser. No. 18/489,079 filed Oct. 18, 2023, which claims priority from Japanese Patent Application No. 2022-189508 filed on Nov. 28, 2022. The entire content of the priority applications is incorporated herein by reference.

BACKGROUND ART

An electrophotographic type image forming apparatus such as a laser printer or an LED printer has been conventionally known in the art. The conventional image forming apparatus includes a developing cartridge and a drum cartridge. The developing cartridge includes a developing roller. The drum cartridge includes a photosensitive drum. When the developing cartridge is attached to the drum cartridge, the developing roller makes contact with the photosensitive drum.

The above developing cartridge of the conventional image forming apparatus also includes a separation member. The separation member is movable relative to a casing of the developing cartridge. The separation member makes contact with a frame of the drum cartridge when the separation moves in a state where the developing cartridge is attached to the drum cartridge. Accordingly, the developing cartridge moves in a separating direction relative to the drum cartridge, thereby separating the developing roller from the photosensitive drum.

DESCRIPTION

The casing of the above developing cartridge is configured of two frames, and one of the two frames supports the developing roller. In the conventional image forming apparatus, the separation member makes contact with the remaining one of the two frames that does not support the developing roller. Hence, the frame that does not support the developing roller receives a load directed in the separating direction from the separation member when the separation member moves and contacts the drum cartridge.

With such a structure, there is a problem in which accuracy in the movement of the developing roller relative to the drum cartridge depends on accuracy in fixing of the two frames of the developing cartridge and accuracy in dimensions of the two frames.

In view of the foregoing, it is an object of the present disclosure to provide a technique by which the developing roller is movable relative to the drum cartridge with high accuracy.

In order to attain the above and other objects, the present disclosure provides a developing cartridge attachable to a drum cartridge. The developing cartridge includes: a developing roller; a casing; and a separation member. The developing roller is rotatable about an axis extending in a first direction. The casing is configured to accommodate developing agent therein. The casing has one end portion in a second direction at which the developing roller is positioned. The second direction crosses the first direction. The casing includes: a first frame; and a second frame. The first frame supports the developing roller. The second frame is fixed to the first frame. The separation member is movable in the first direction relative to the casing. The separation member includes: a separation shaft; and a first inclined surface. The separation shaft extends in the first direction. The first inclined surface is positioned at one end portion in the first direction of the separation member. The first inclined surface extends away from the developing roller in the second direction as extending toward another end portion in the first direction of the separation member. The first frame has a load receiving surface facing the separation shaft in the second direction. The load receiving surface makes contact with the separation shaft to receive a load directed in the second direction from the separation shaft when the separation member moves in the first direction and the first inclined surface makes contact with the drum cartridge in a state where the developing cartridge is attached to the drum cartridge.

In the above structure, the first frame that supports the developing roller receives a load directed in the second direction during a separating operation in which the developing roller moves relative to the drum cartridge. This structure allows the developing roller to move in the second direction relative to the drum cartridge with high accuracy.

Figure 1:
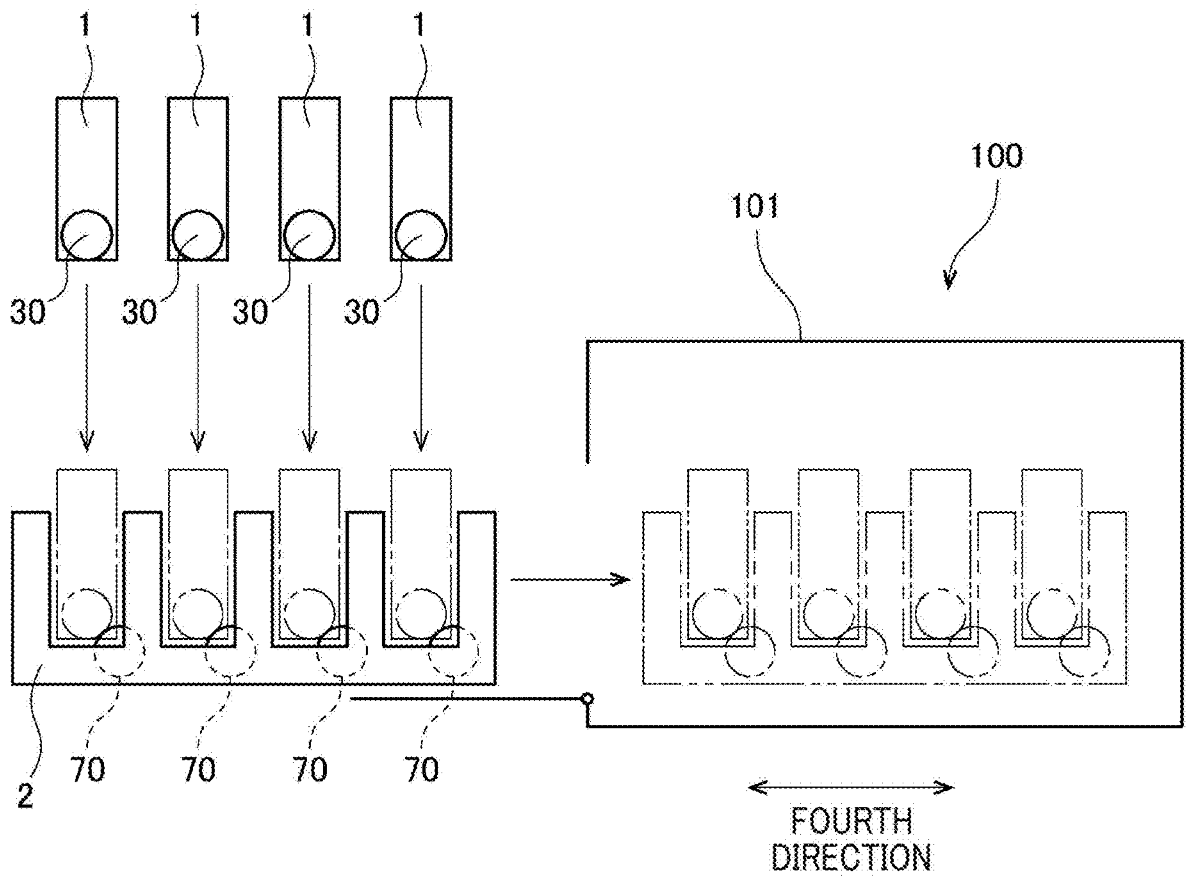
FIG. 1 is a schematic diagram of an image forming apparatus.

Hereinafter, one embodiment of the present disclosure will be described with reference to the accompanying drawings.

In the following description, a direction in which a rotation axis of a developing roller 30 extends will be referred to as "first direction". Further, a direction in which one end portion of a casing 10 of a developing cartridge 1, at which the developing roller 30 is positioned, and another end portion of the casing 10 are arranged will be referred to as "second direction". Still further, a direction in which a rotation axis of a first developing guide roller 17 extends will be referred to as "third direction". Still further, a direction in which a plurality of photosensitive drums 70 are arranged in a drum cartridge 2 will be referred to as "fourth direction".

The first direction and the second direction cross each other. Preferably, the first direction and the second direction are orthogonal to each other. The first direction and the third direction cross each other. Preferably, the first direction and the third direction are orthogonal to each other. The first direction and the fourth direction cross each other. Preferably, the first direction and the fourth direction are orthogonal to each other. The second direction and the third direction cross each other. The second direction and the fourth direction cross each other.

The third direction and the fourth direction cross each other.

1. Structure of Image Forming Apparatus 100

FIG. 1 is a schematic diagram of an image forming apparatus 100. The image forming apparatus 100 is an electrophotographic type printer. Specifically, the image forming apparatus 100 is a laser printer or an LED printer. As illustrated in FIG. 1, the image forming apparatus 100 includes a main frame 101, the drum cartridge 2, and four developing cartridges 1.

The four developing cartridges 1 are attachable to the drum cartridge 2. Further, the drum cartridge 2 to which the four developing cartridges 1 are attached is attachable to the main frame 101. The drum cartridge 2 is attachable to and detachable from the main frame 101 as the drum cartridge 2 slidingly moves in the fourth direction relative to the main frame 101.

The four developing cartridges 1 accommodate therein developing agent of colors different from one another (for example, colors of yellow, magenta, cyan, and black). The developing agent is, for example, toner. The image forming apparatus 100 is configured to perform printing to form an image on a surface of a printing sheet using the developing agent supplied from the developing cartridges 1.

2. Structure of Developing Cartridge

Figure 2:
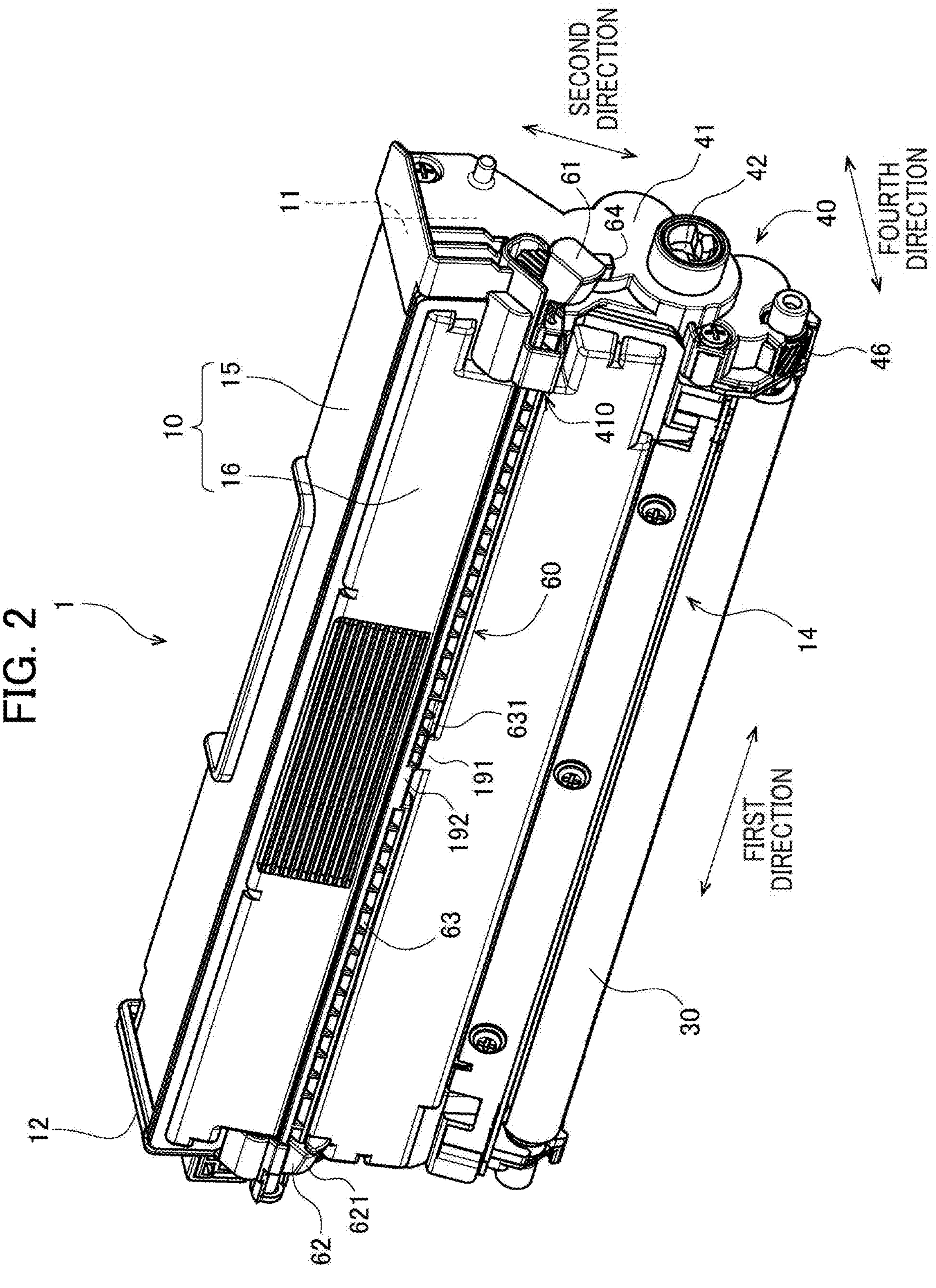
FIG. 2 is a perspective view of a developing cartridge.
Figure 3:
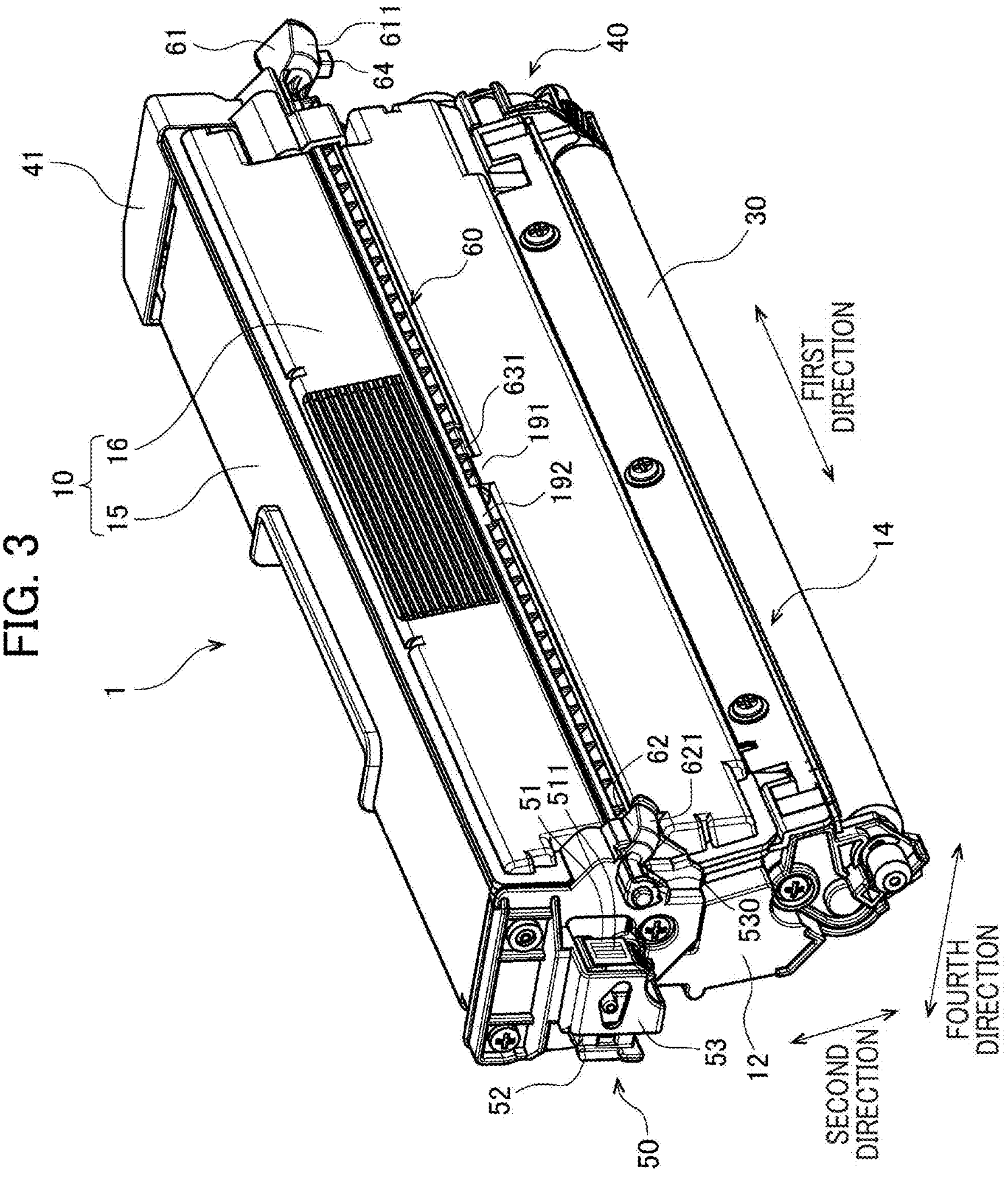
FIG. 3 is another perspective view of the developing cartridge.
Figure 4:
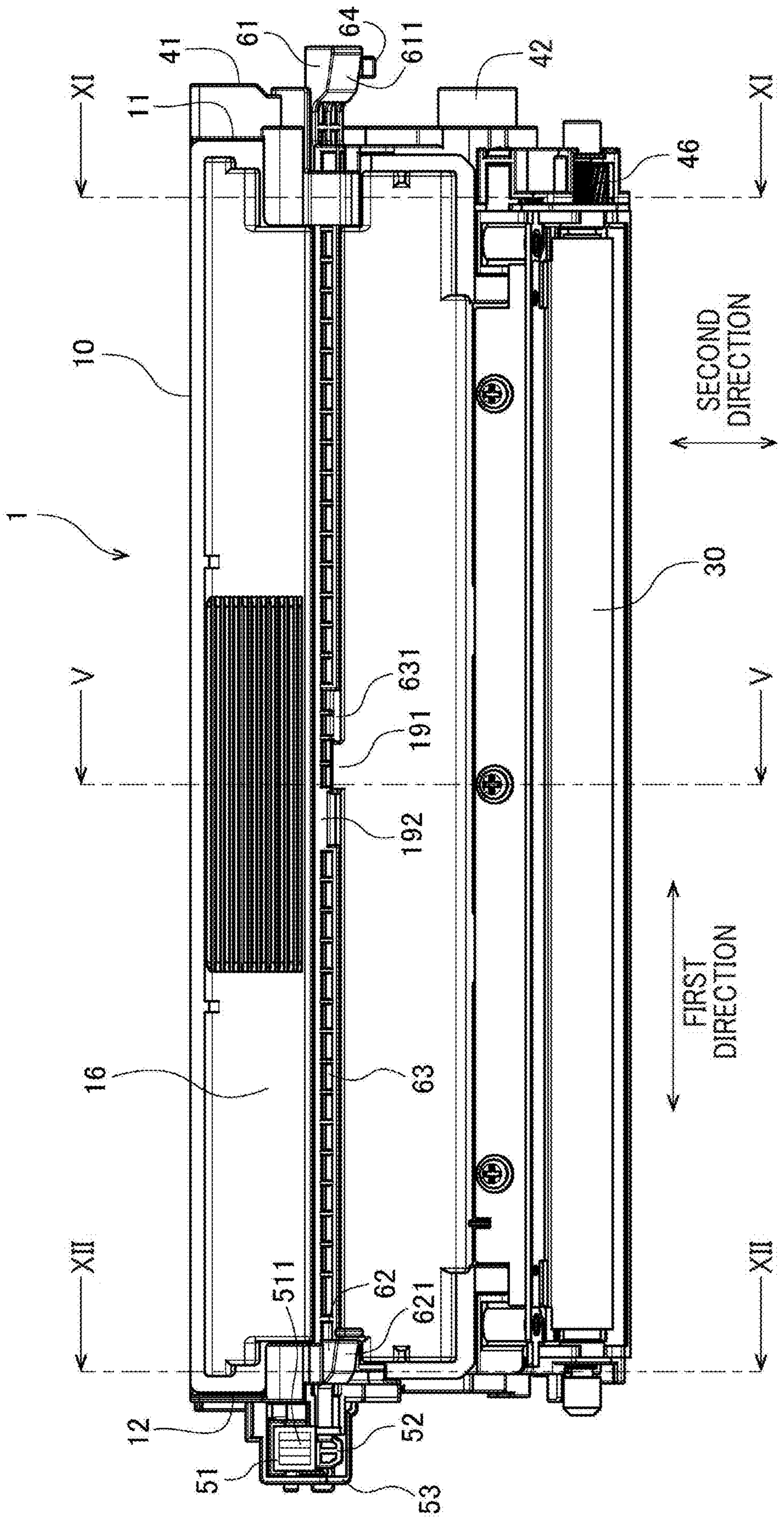
FIG. 4 is a front view of the developing cartridge.
Figure 5:
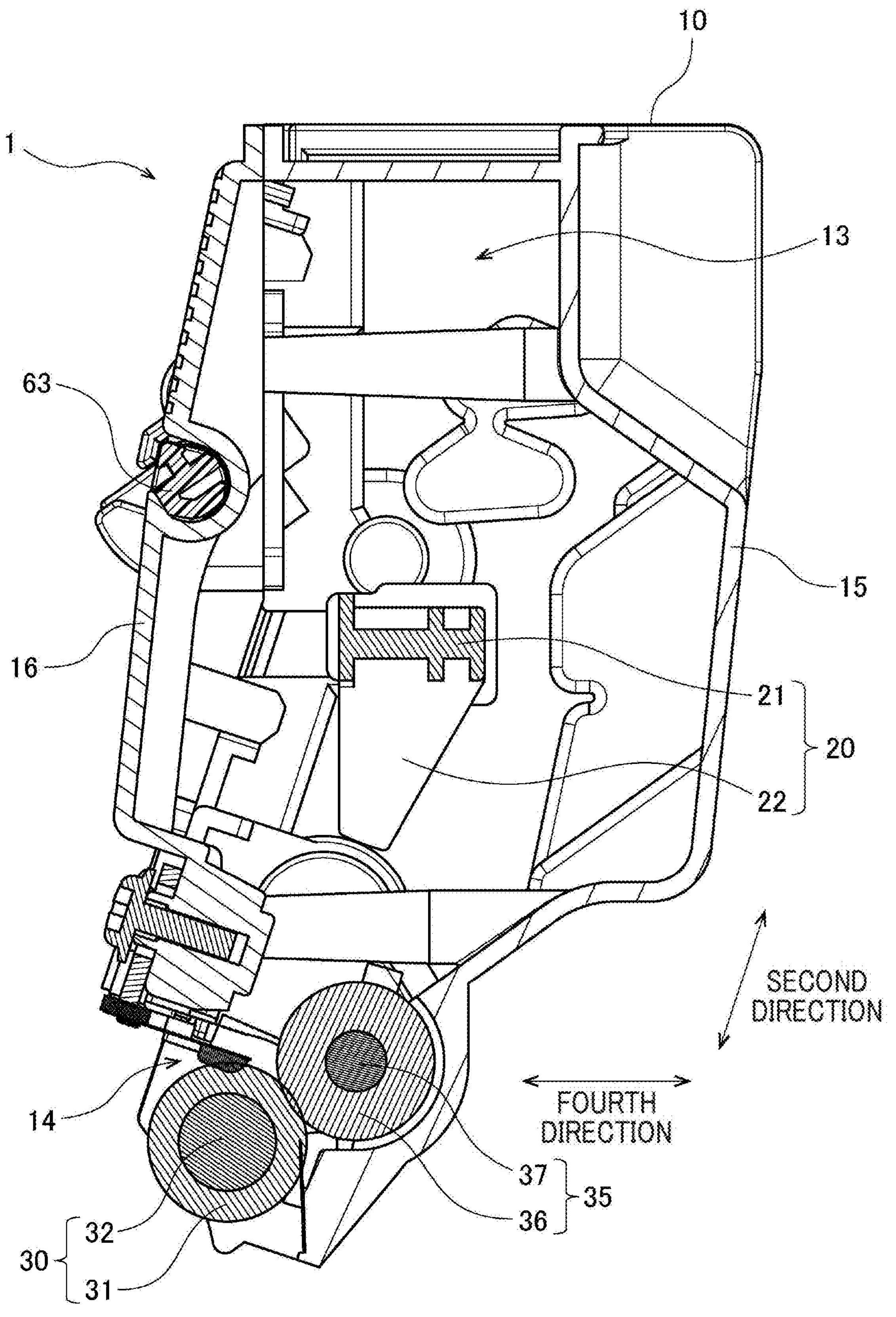
FIG. 5 is a cross-sectional view of the developing cartridge taken along line V-V in FIG. 4.

FIGS. 2 and 3 are perspective views of the developing cartridge 1. FIG. 4 is a front view of the developing cartridge 1 (as viewed in the fourth direction). FIG. 5 is a cross-sectional view of the developing cartridge 1 taken along line V-V in FIG. 4. As illustrated in FIGS. 2 through 5, the developing cartridge 1 includes the casing 10, an agitator 20, the developing roller 30, a supply roller 35, a gear portion 40, a memory assembly 50, and a separation member 60.

2-1. Casing

The casing 10 is a container configured to accommodate therein developing agent. The casing 10 has a first outer surface 11, and a second outer surface 12. The first outer surface 11 is positioned at one end portion in the first direction of the casing 10. The second outer surface 12 is positioned at another end portion in the first direction of the casing 10. The first outer surface 11 and the second outer surface 12 are spaced apart from each other in the first direction.

An accommodation chamber 13 is formed in the casing 10. The developing agent is accommodated in the accommodation chamber 13. The casing 10 also has an opening 14. The opening 14 is positioned at the one end portion in the second direction of the casing 10. The accommodation chamber 13 and an outer space of the casing 10 are in communication with each other through the opening 14.

The casing 10 includes a first frame 15, and a second frame 16. The first frame 15 and the second frame 16 extend in the first direction. The first frame 15 and the second frame 16 are arranged in the fourth direction. The first frame 15 has a substantially cup-like shape. Specifically, the first frame 15 is recessed away from the second frame 16 in the fourth direction. The second frame 16 has a substantially plate-like shape. The first frame 15 and the second frame 16 are fixed to each other. The accommodation chamber 13 is a space enclosed by the first frame 15 and the second frame 16.

2-2. Agitator

The agitator 20 is configured to agitate toner inside the casing 10. As illustrated in FIG. 5, the agitator 20 includes an agitator shaft 21, and an agitator fin 22. The agitator shaft 21 extends in the first direction inside the casing 10. The agitator shaft 21 is supported by the casing 10 while the agitator shaft 21 is rotatable about an agitator axis extending in the first direction. The agitator fin 22 extends radially outward from the agitator shaft 21.

2-3. Developing Roller

The developing roller 30 is rotatable about a developing axis (the rotation axis) extending in the first direction. The developing roller 30 is positioned at the opening 14 of the casing 10. That is, the developing roller 30 is positioned at the one end portion in the second direction of the casing 10.

The developing roller 30 includes a developing roller body 31, and a developing roller shaft 32. The developing roller body 31 is a hollow cylindrical member extending in the first direction. The developing roller body 31 is made of, for example, rubber having elasticity. The developing roller shaft 32 is a solid cylindrical member extending in the first direction and penetrating the developing roller body 31. The developing roller body 31 is fixed to the developing roller shaft 32. The developing roller shaft 32 is made of metal or electrically conductive resin.

The developing roller 30 is supported by the first frame 15. The developing roller shaft 32 has one end portion in the first direction supported by one end portion in the first direction of the first frame 15 through a bearing. The developing roller shaft 32 also has another end portion in the first direction supported by another end portion in the first direction of the first frame 15 through a bearing. The developing roller 30 is rotatable about the developing axis by a driving force supplied from the image forming apparatus 100. The developing agent in the casing 10 is held on an outer circumferential surface of the developing roller 30 (i.e., an outer circumferential surface of the developing roller body 31).

2-4. Supply Roller

The supply roller 35 is rotatable about a supply axis extending in the first direction. The supply roller 35 is positioned inside the casing 10. Specifically, the supply roller 35 is positioned between the developing roller 30 and the agitator 20 in the second direction.

The supply roller 35 includes a supply roller body 36, and a supply roller shaft 37. The supply roller body 36 is a hollow cylindrical member extending in the first direction. The supply roller body 36 is made of, for example, rubber having elasticity. An outer circumferential surface of the supply roller body 36 makes contact with the outer circumferential surface of the developing roller body 31. The supply roller shaft 37 is a solid cylindrical member extending in the first direction and penetrating the supply roller body 36. The supply roller body 36 is fixed to the supply roller shaft 37.

2-5. Gear Portion

Figure 6:
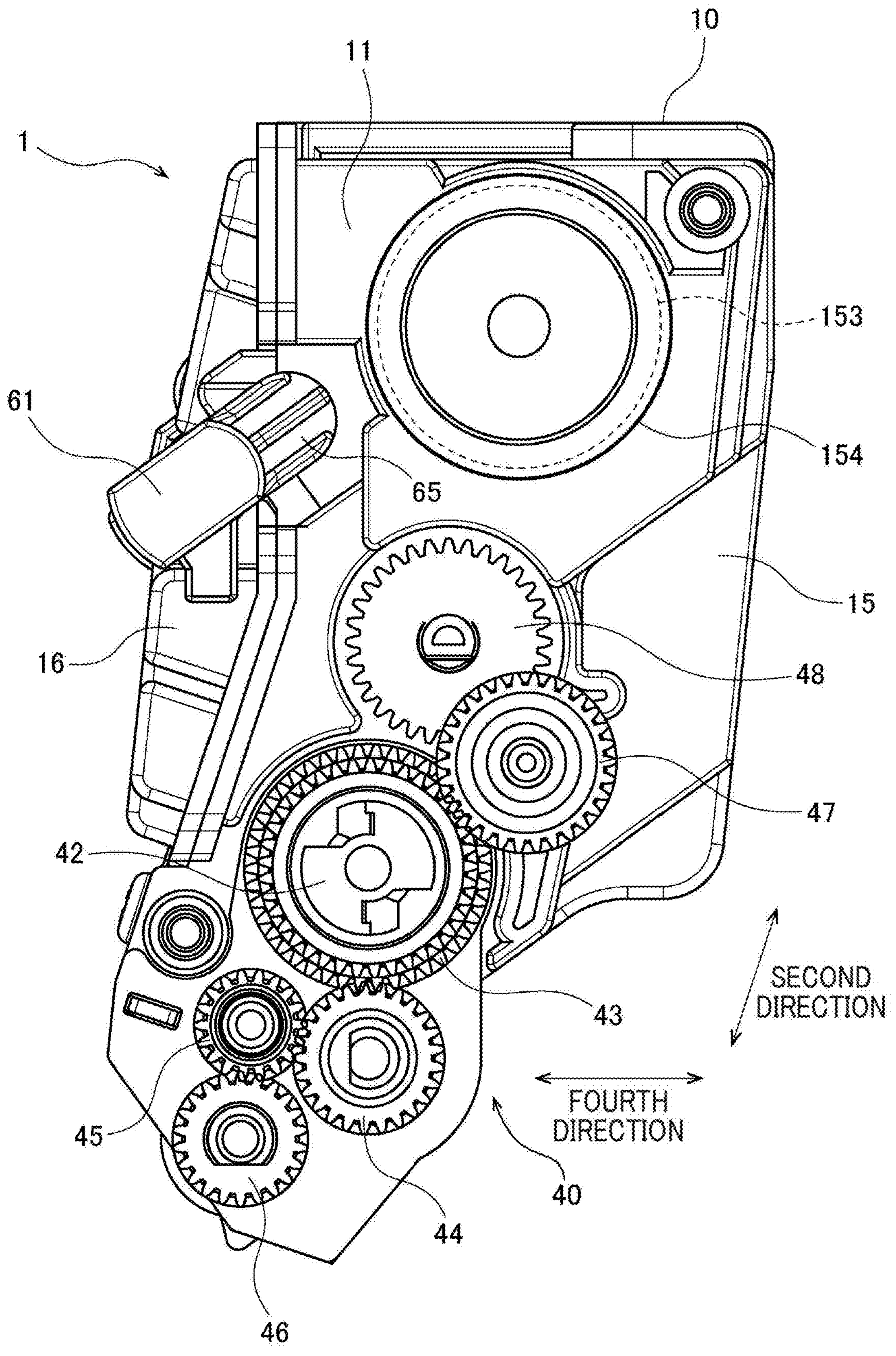
FIG. 6 is a view of the developing cartridge in which a gear cover is detached therefrom as viewed in a first direction from the side of a first outer surface.
Figure 7:
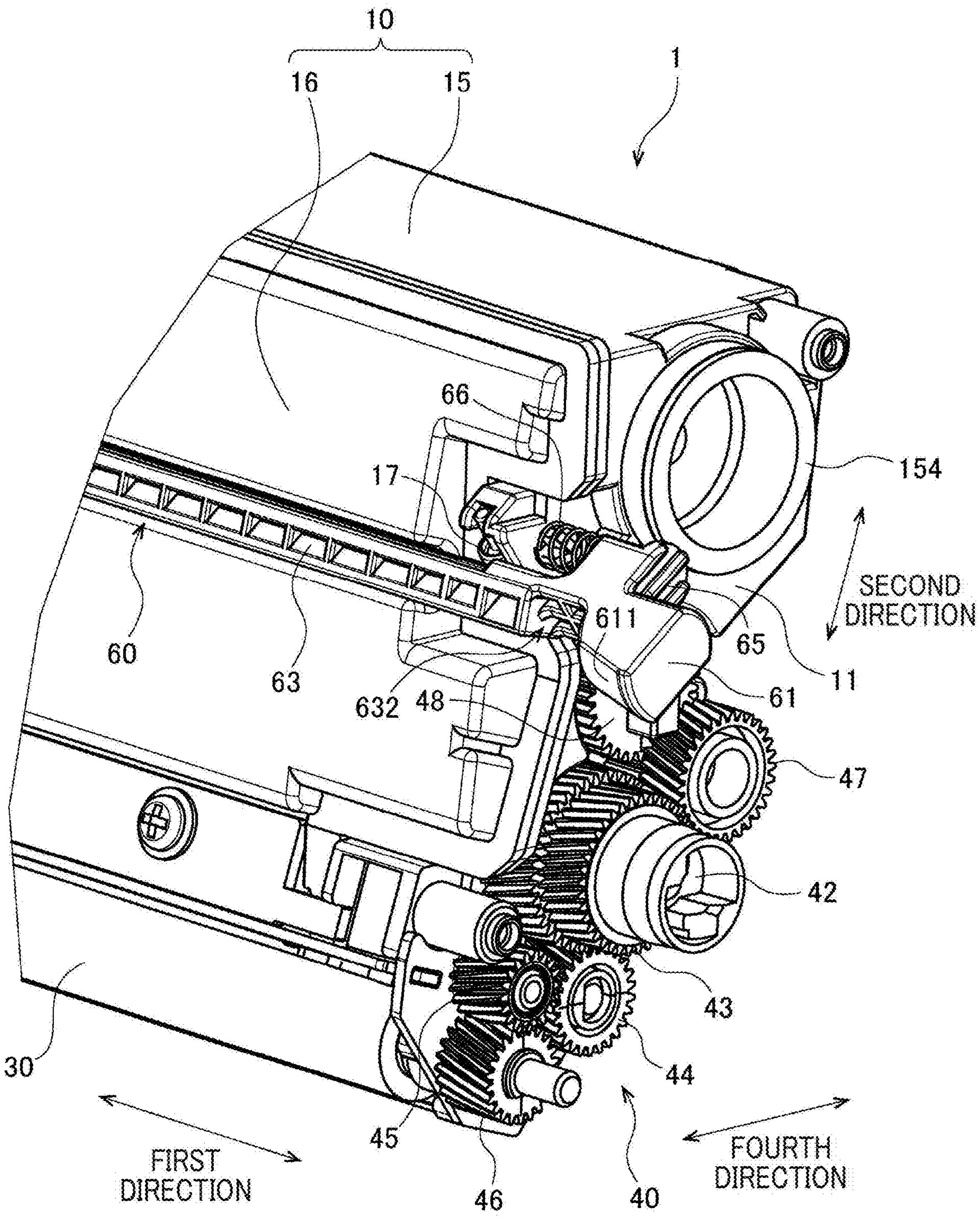
FIG. 7 is a partial perspective view of the developing cartridge in which the gear cover is detached therefrom.
Figure 8:
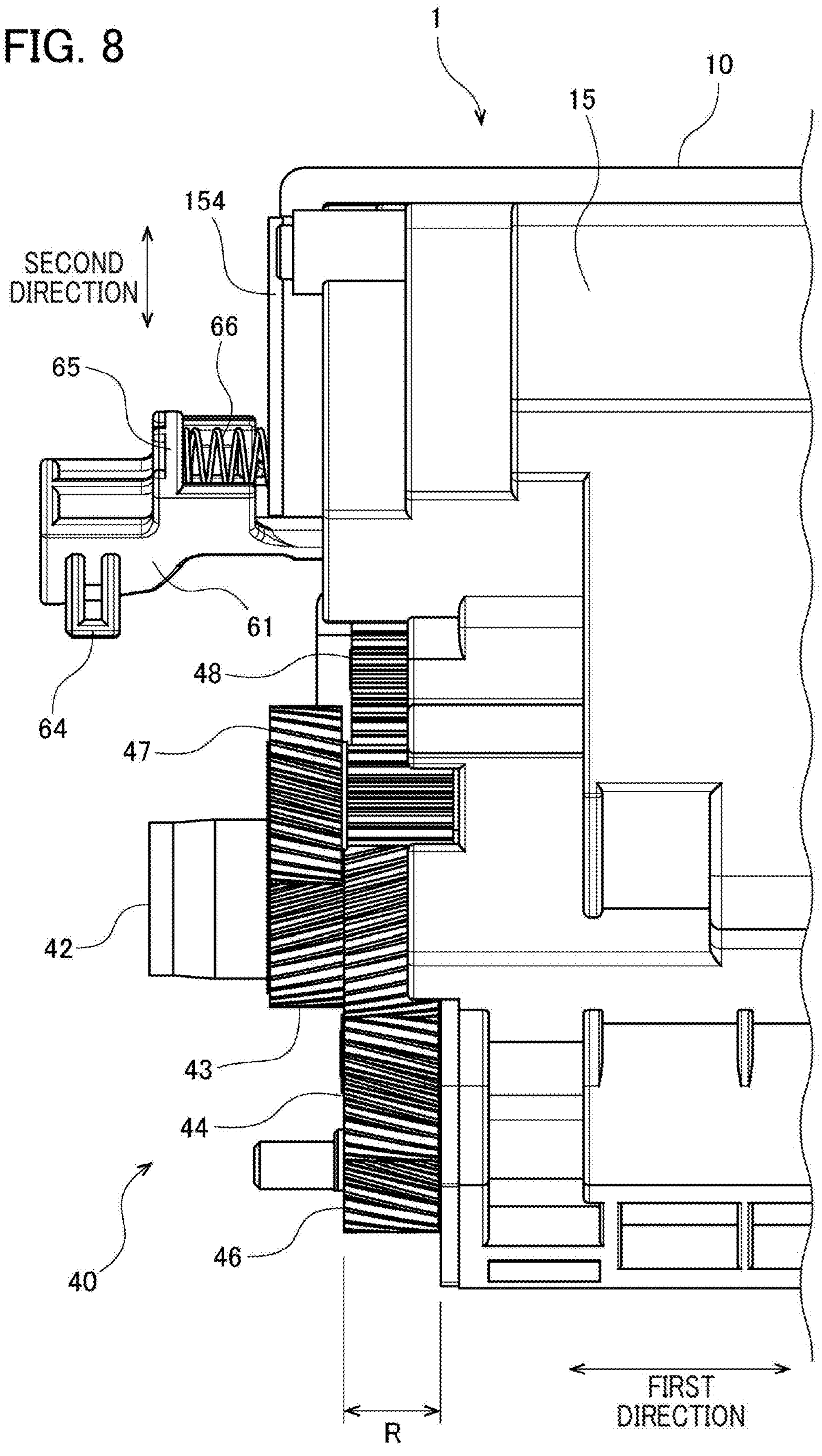
FIG. 8 is a view of a portion in the vicinity of the first outer surface of the developing cartridge in which the gear cover is detached therefrom as viewed in a fourth direction from the side of a first frame.

The gear portion 40 is positioned at the first outer surface 11 of the casing 10. As illustrated in FIGS. 2 through 4, the gear portion 40 includes a gear cover 41 attached to the first outer surface 11 of the casing 10. FIG. 6 illustrates the developing cartridge 1 in which the gear cover 41 is detached therefrom as viewed in the first direction and in a direction from the first outer surface 11 toward the second outer surface 12. FIG. 7 is a partial perspective view of the developing cartridge 1 in which the gear cover 41 is detached therefrom. FIG. 8 illustrates the developing cartridge 1 in which the gear cover 41 is detached therefrom, and particularly illustrates a portion in the vicinity of the first outer surface 11 as viewed in the fourth direction and in a direction from the first frame 15 toward the second frame 16.

As illustrated in FIGS. 6 through 8, the gear portion 40 further includes a coupling 42, a coupling gear 43, a supply roller gear 44, a first idle gear 45, a developing roller gear 46, a second idle gear 47, and an agitator gear 48. The coupling gear 43, the supply roller gear 44, the first idle gear 45, the developing roller gear 46, the second idle gear 47, and the agitator gear 48 are positioned between the first outer surface 11 and the gear cover 41 in the first direction. That is, the coupling gear 43, the supply roller gear 44, the first idle gear 45, the developing roller gear 46, the second idle gear 47, and the agitator gear 48 are covered with the gear cover 41.

The coupling 42, the coupling gear 43, the supply roller gear 44, the first idle gear 45, the developing roller gear 46, the second idle gear 47, and the agitator gear 48 are rotatable about their axes extending in the first direction.

The coupling 42 is exposed to an outside through the gear cover 41. When the drum cartridge 2 to which the developing cartridges 1 are attached is attached to the main frame 101, a drive shaft of the image forming apparatus 100 becomes connected to the coupling 42 of the corresponding developing cartridge 1, whereby rotation of the drive shaft is transmitted to the coupling 42. The coupling gear 43 rotates together with the coupling 42.

The coupling gear 43 is in meshing engagement with the supply roller gear 44. The supply roller gear 44 is in meshing engagement with the first idle gear 45. The first idle gear 45 is in meshing engagement with the developing roller gear 46. Further, the coupling 42 is also in meshing engagement with the second idle gear 47. The second idle gear 47 is in meshing engagement with the agitator gear 48.

The supply roller gear 44 is coupled to one end in the first direction of the supply roller shaft 37. Hence, rotation of the coupling 42 is transmitted to the supply roller shaft 37 through the coupling gear 43 and the supply roller gear 44. Thus, the supply roller 35 rotates about the supply axis.

The developing roller gear 46 is coupled to one end portion in the first direction of the developing roller shaft 32. Accordingly, the rotation of the coupling 42 is transmitted to the developing roller shaft 32 through the coupling gear 43, the supply roller gear 44, the first idle gear 45, and the developing roller gear 46 to rotate the developing roller 30 about the developing axis.

The agitator gear 48 is coupled to one end in the first direction of the agitator shaft 21. Hence, the rotation of the coupling 42 is transmitted to the agitator shaft 21 through the coupling gear 43, the second idle gear 47, and the agitator gear 48. Thus, the agitator 20 rotates about the agitator axis, thereby agitating the developing agent in the casing 10.

As illustrated in FIG. 8, a part of the coupling gear 43, the supply roller gear 44, the first idle gear 45, the developing roller gear 46, a part of the second idle gear 47, and the agitator gear 48 are positioned within a range R along the first direction. This structure makes the gear portion 40 thinner in the first direction in comparison with an arrangement where these gears are at positions different from each other in the first direction.

Here, each of the coupling gear 43 and the second idle gear 47 has a dimension in the first direction that is greater than that of the other gears. The coupling gear 43 is a two-stage gear. Therefore, the coupling gear 43 can transmit rotation to the supply roller gear 44 and the second idle gear 47 at a different rotational speed. Further, the second idle gear 47 is a two-stage gear. With such a structure, a rotational speed can be changed when the rotation is transmitted from the coupling gear 43 to the agitator gear 48 through the second idle gear 47.

As illustrated in FIGS. 6 through 8, the first frame 15 has a filling port 153, and includes a cap 154 for closing the filling port 153. The filling port 153 is positioned at the one end portion in the first direction of the first frame 15. Further, the filling port 153 is positioned farther away from the developing roller 30 than the agitator gear 48 is from the developing roller 30 in the second direction. The developing agent is supplied to the accommodation chamber 13 of the casing 10 through the filling port 153.

Further, as illustrated in FIG. 8, the filling port 153 protrudes further outward than the range R described above in the first direction. That is, the filling port 153 is positioned further outward of the casing 10 in the first direction than the supply roller gear 44, the first idle gear 45, the developing roller gear 46, and the agitator gear 48.

2-6. Memory Assembly

The memory assembly 50 is positioned at the second outer surface 12 of the casing 10. As illustrated in FIGS. 3 and 4, the memory assembly 50 includes a memory 51, a holder 52, and a holder cover 53.

The memory 51 is a storage medium configured to store therein information related to the developing cartridge 1. The memory 51 is, for example, an IC chip. The memory 51 stores therein information related to a specification or a service life of the developing cartridge 1, for example. The memory 51 has an electrical contact surface 511. The electrical contact surface 511 is electrically connected to a memory cell of the memory 51. The electrical contact surface 511 is positioned at one end portion in the fourth direction of the holder 52. In the present embodiment, the memory 51 is held on the one end portion in the fourth direction of the holder 52. Alternatively, only the electrical contact surface 511 may be held on the holder 52, and the memory cell of the memory 51 may be held on a part of the developing cartridge 1 other than the holder 52.

The holder cover 53 is attached to the second outer surface 12 of the casing 10. At least a part of the holder 52 is covered with the holder cover 53. The holder 52 is positioned between the second outer surface 12 and the holder cover 53 in the first direction. The holder 52 is movable in the first direction, the second direction, and the fourth direction relative to the casing 10 and the holder cover 53. Hence, the electrical contact surface 511 of the memory 51 is also movable in the first direction, the second direction, and the fourth direction relative to the casing 10 and the holder cover 53.

2-7. Separation Member and Return Spring

In a state where the drum cartridge 2 to which the four developing cartridges 1 are attached is attached to the main frame 101, the image forming apparatus 100 can perform a separating operation for each of the developing cartridges 1. The separating operation is an operation for moving the developing roller 30 relative to the photosensitive drum 70 from a contacting position in which the developing roller 30 is in contact with the corresponding photosensitive drum 70 to a separated position in which the developing roller 30 is in separation from the corresponding photosensitive drum 70. The separating operation is performed in the image forming apparatus 100 for the developing cartridge 1 that is not used among the four developing cartridges 1. Through this operation, the developing roller 30 of the developing cartridge 1 that is not used can be separated from the corresponding photosensitive drum 70. The separation member 60 is configured to switch a position of the developing roller 30 between the contacting position and the separated position described above. That is, the developing cartridge 1 is switchable, by the separation member 60, between a state in which the developing roller 30 is positioned at the contacting position and a state in which the developing roller 30 is positioned at the separated position.

The separation member 60 is positioned between the one end portion and the other end portion in the second direction of the casing 10. As illustrated in FIGS. 2 through 4, the separation member 60 includes a first cam 61, a second cam 62, and a separation shaft 63. The separation member 60 is, for example, made of resin. Specifically, the first cam 61, the second cam 62, and the separation shaft 63 are integrally molded with resin. As a modification, the first cam 61, the second cam 62, and the separation shaft 63 may be formed independently of one another. In the latter case, only the first cam 61 and the second cam 62 may be made of resin, and the separation shaft 63 may be made of metal.

Figure 9:
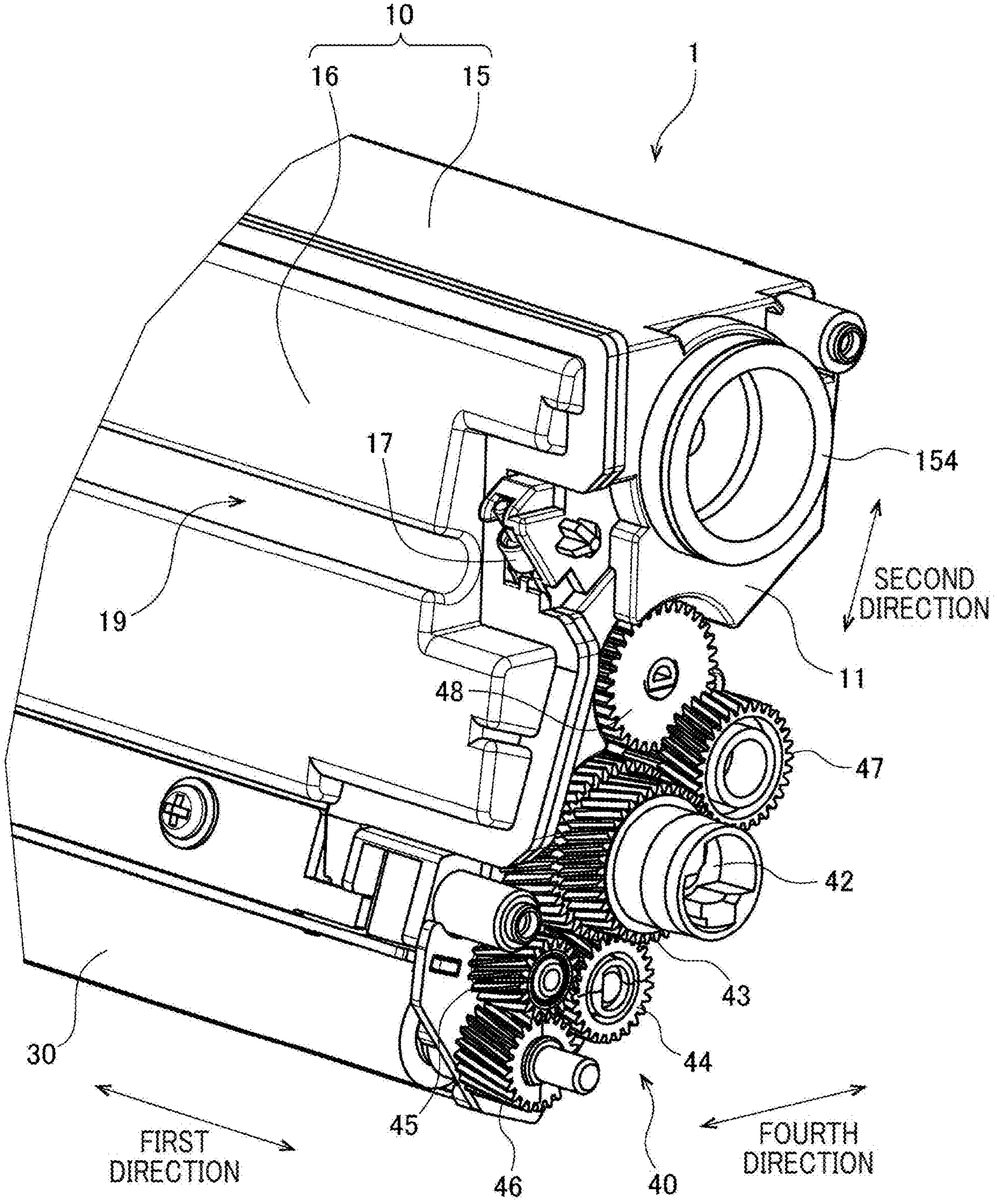
FIG. 9 is a partial perspective view of the developing cartridge in which the gear cover and a separation member are detached therefrom.
Figure 10:
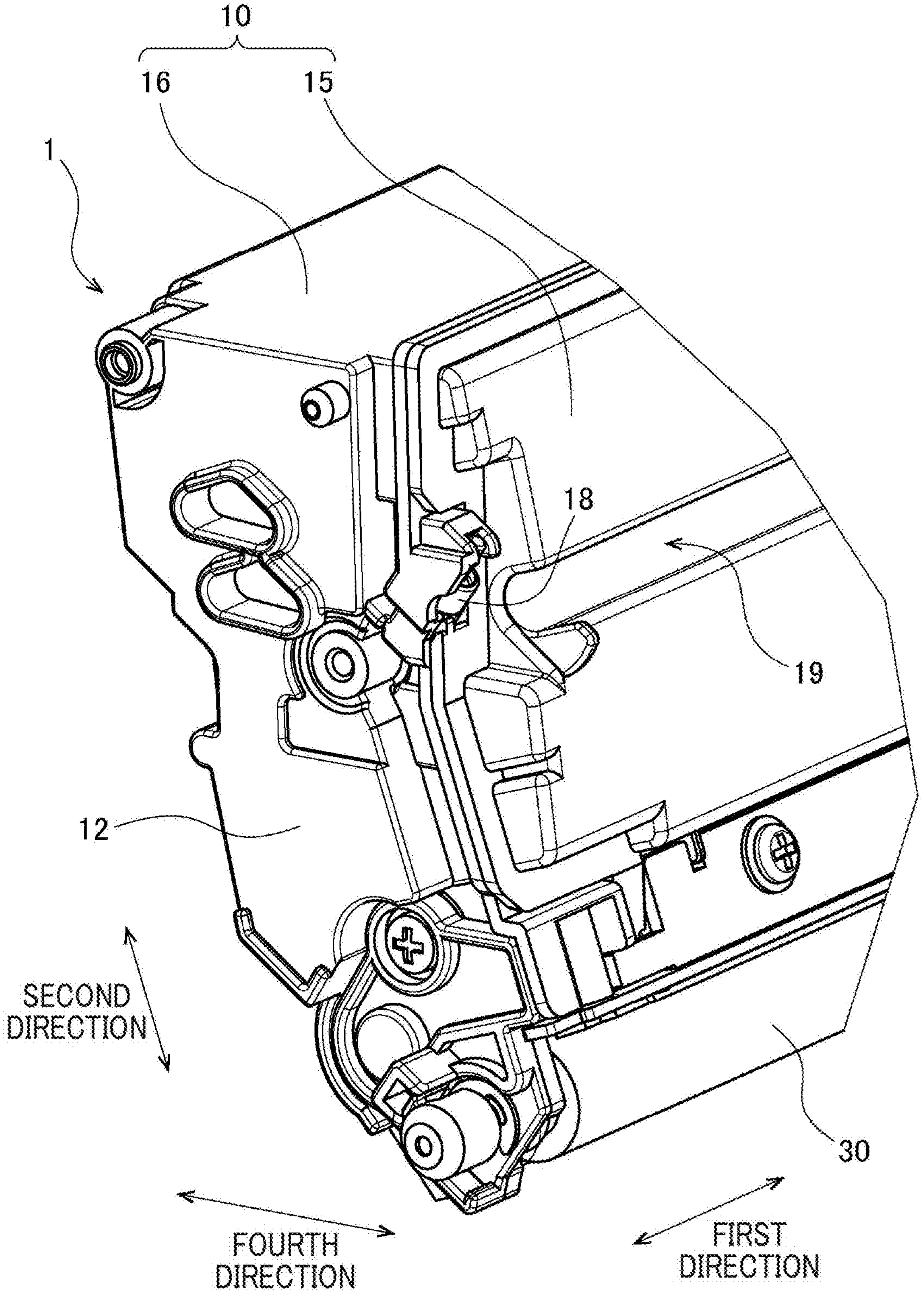
FIG. 10 is a partial perspective view of the developing cartridge in which a memory assembly and the separation member are detached therefrom.

FIG. 9 is a partial perspective view of the developing cartridge 1 in which the gear cover 41 and the separation member 60 are detached therefrom. FIG. 10 is another partial perspective view of the developing cartridge 1 in which the memory assembly 50 and the separation member 60 are detached therefrom. As illustrated in FIGS. 9 and 10, the casing 10 further has a guide groove 19. The guide groove 19 is a groove that is recessed in the fourth direction at the outer surface of the second frame 16. The guide groove 19 extends in the first direction.

As illustrated in FIG. 2, the gear cover 41 has a gear cover hole 410. The gear cover hole 410 penetrates the gear cover 41 in the first direction at a position overlapped with the guide groove 19 when viewed in the first direction. In the meantime, as illustrated in FIG. 3, the holder cover 53 has a holder cover hole 530. The holder cover hole 530 penetrates the holder cover 53 in the first direction at a position overlapped with the guide groove 19 when viewed in the first direction.

The separation shaft 63 is positioned within the guide groove 19 and extends in the first direction along the guide groove 19. The separation shaft 63 has one end portion in the first direction inserted through the gear cover hole 410. Hence, the one end portion in the first direction of the separation shaft 63 is supported by the gear cover 41. The separation shaft 63 also has another end portion in the first direction inserted through the holder cover hole 530. Hence, the other end portion in the first direction of the separation shaft 63 is supported by the holder cover 53.

As illustrated in FIGS. 2 through 4, the casing 10 also includes a first rib 191, and a second rib 192. The first rib 191 and the second rib 192 are positioned at the outer surface of the second frame 16 and at a center in the first direction of the casing 10. The guide groove 19 has one end edge and another end edge in the second direction. The first rib 191 protrudes from a center in the first direction of the one end edge of the guide groove 19 toward the other edge of the guide groove 19. The second rib 192 protrudes from a center in the first direction of the other end edge of the guide groove 19 toward the one end edge of the guide groove 19. The first rib 191 and the second rib 192 are positioned apart from each other in the second direction.

Each of the first rib 191 and the second rib 192 covers a part of the separation shaft 63 positioned in the guide groove 19. Hence, deflection of the separation shaft 63 toward the outside of the casing 10 in the fourth direction can be restricted. Specifically, the separation shaft 63 includes a small diameter portion 631 at a center in the first direction of the separation shaft 63. The small diameter portion 631 has a thickness that is smaller than that of the remaining part of the separation shaft 63. In other words, the small diameter portion 631 has a diameter that is smaller than that of the remaining part of the separation shaft 63. Each of the first rib 191 and the second rib 192 covers the small diameter portion 631. This structure can restrain the first rib 191 and the second rib 192 from protruding toward the outside of the outer surface of the second frame 16.

Further, the small diameter portion 631 of the separation shaft 63 is positioned between the first rib 191 and the second rib 192 in the second direction. This arrangement can restrain the center in the first direction of the separation shaft 63 from deflecting in the second direction.

The first cam 61 is positioned at one end portion in the first direction of the separation member 60. The first cam 61 is positioned at the first outer surface 11 of the casing 10. The first cam 61 has a first inclined surface 611. The first inclined surface 611 is a part of a peripheral surface centered on the separation shaft 63. The first inclined surface 611 is inclined relative to the first direction. Specifically, the first inclined surface 611 is inclined so that the first inclined surface 611 extends away from the developing roller 30 in the second direction as extending toward another end portion in the first direction of the separation member 60.

The second cam 62 is positioned at the other end portion in the first direction of the separation member 60. The second cam 62 is positioned at the second outer surface 12 of the casing 10. The second cam 62 has a second inclined surface 621. The second inclined surface 621 is a part of the peripheral surface centered on the separation shaft 63. The second inclined surface 621 is inclined relative to the first direction. Specifically, the second inclined surface 621 is inclined so that the second inclined surface 621 extends away from the developing roller 30 in the second direction as extending toward the other end portion in the first direction of the separation member 60.

As illustrated in FIGS. 2 through 4 and 8, the separation member 60 further includes a positioning protrusion 64 as an example of the protrusion. The positioning protrusion 64 is positioned at the one end portion in the first direction of the separation member 60. The positioning protrusion 64 protrudes outward in a radial direction of the separation shaft 63 from the first cam 61. Specifically, the positioning protrusion 64 protrudes from the first cam 61 in a direction approaching the developing roller 30 in the second direction. In a state where the developing cartridge 1 is attached to the drum cartridge 2, the positioning protrusion 64 makes contact with an inner surface of a corresponding first side member 83 (described later, see FIGS. 13 and 14) of the drum cartridge 2 in the first direction, whereby positioning of the separation member 60 in the first direction relative to the first side member 83 is attained.

The separation member 60 is movable in the first direction between a first position and a second position relative to the casing 10 and the developing roller 30. The first position is a position in the first direction of the separation member 60 in which the positioning protrusion 64 is in contact with the first side member 83. Movement of the separation member 60 from the first position to the second position denotes movement in a direction from the first cam 61 toward the second cam 62. That is, as a result of the movement in the first direction of the separation member 60 at the first position toward the other end portion in the first direction of the separation member 60, the separation member 60 is positioned at the second position.

The separation member 60 further includes a spring seat 65 (see FIG. 7). The spring seat 65 is positioned at the one end portion in the first direction of the separation member 60. The spring seat 65 extends from the first cam 61 in a direction away from the first inclined surface 611 in the second direction.

The developing cartridge 1 further includes a return spring 66 (see FIG. 7). The return spring 66 is an elastic member configured to expand and contract in the first direction. The return spring 66 is covered with the gear cover 41. For example, a compression coil spring is employed as the return spring 66. Of the one end portion and the other end portion in the first direction of the casing 10, the return spring 66 is positioned only at the one end portion in the first direction of the casing 10. The return spring 66 is positioned apart from and further radially outward than an outer peripheral surface of the separation shaft 63. The return spring 66 has one end portion in the first direction in contact with the spring seat 65, and another end portion in the first direction in contact with the casing 10. Specifically, the other end portion in the first direction of the return spring 66 is in contact with the first frame 15.

The return spring 66 is compressed in the first direction to have a length that is smaller than the natural length thereof. Hence, the return spring 66 urges the separation member 60 in a direction directed from the second position toward the first position in the first direction. In other words, the return spring 66 urges the separation member 60 in a direction directed from the second cam 62 toward the first cam 61. Due to an urging force of the return spring 66, the separation member 60 is positioned at the first position in a state where the separation member 60 is not pressed by a pressure shaft 102 (described later, FIG. 16).

As illustrated in FIG. 7, the separation shaft 63 has a recessed portion 632. The recessed portion 632 is positioned at the one end portion in the first direction of the separation shaft 63. The recessed portion 632 is positioned juxtaposed with the first inclined surface 611 in the first direction. The recessed portion 632 is positioned closer to the other end portion in the first direction of the separation member 60 than the first inclined surface 611 is to the other end portion in the first direction of the separation member 60. Further, the recessed portion 632 is positioned between the first inclined surface 611 and the first developing guide roller 17 (described later) in the first direction. The recessed portion 632 is recessed away from the developing roller 30 in the second direction. Accordingly, the separation shaft 63 can be restrained from making contact with the first side member 83 (described later) of the drum cartridge 2.

2-8. Developing Guide Rollers

Figure 11:
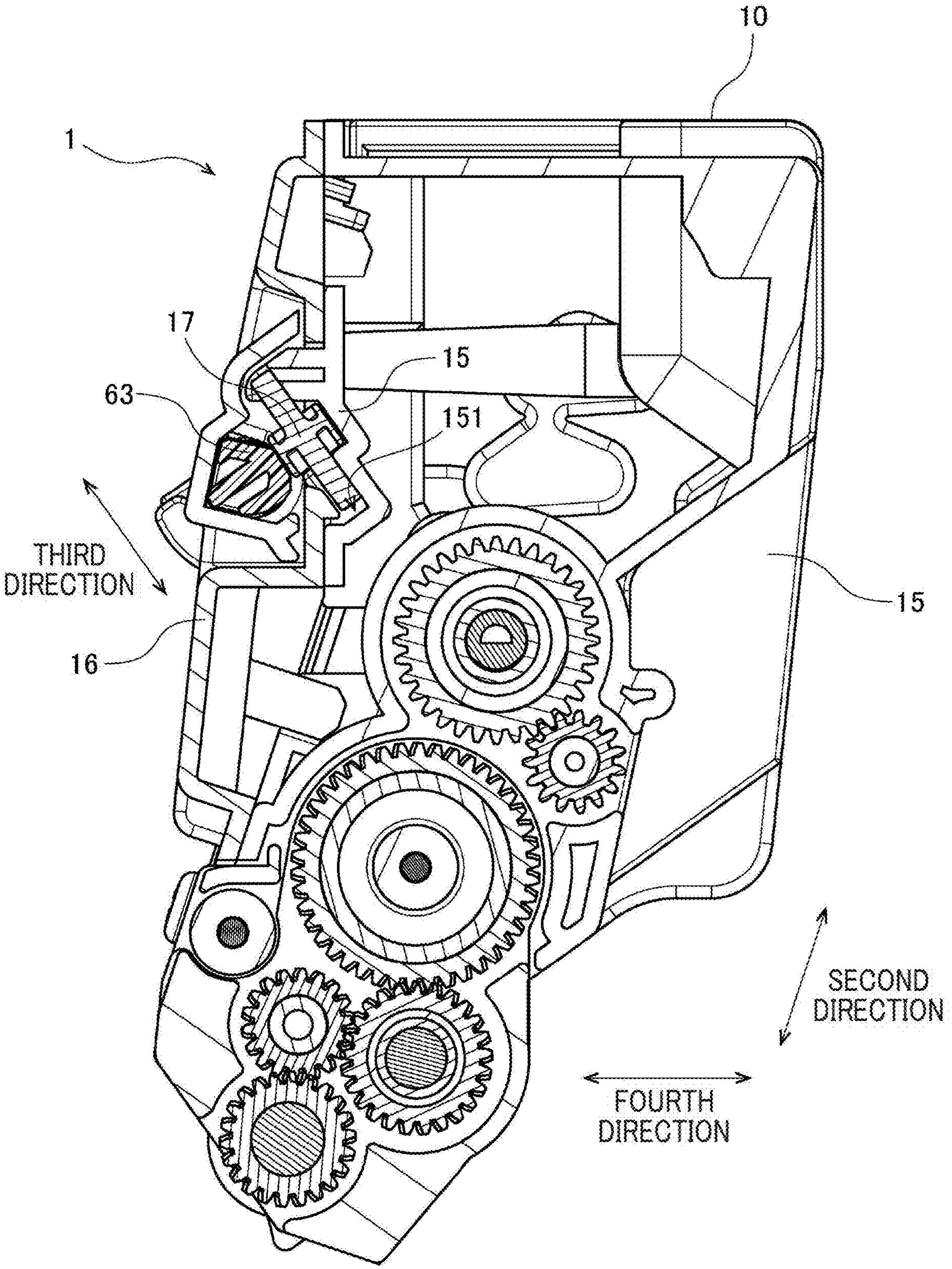
FIG. 11 is a cross-sectional view of the developing cartridge taken along line XI-XI in FIG. 4.

FIG. 11 is a cross-sectional view of the developing cartridge 1 taken along line XI-XI in FIG. 4. As illustrated in FIGS. 9 and 11, the first frame 15 of the casing 10 further includes the first developing guide roller 17. The first developing guide roller 17 is positioned at the one end portion in the first direction of the first frame 15. Note that the first developing guide roller 17 is positioned closer to the other end portion in the first direction of the separation member 60 than the return spring 66 is to the other end portion in the first direction of the separation member 60.

The first developing guide roller 17 is rotatable about a first axis extending in the third direction. The first developing guide roller 17 has a hollow cylindrical outer circumferential surface centered on the first axis. The outer circumferential surface of the first developing guide roller 17 faces the separation shaft 63 in the second direction and makes contact with the separation shaft 63. The first developing guide roller 17 rotates about the first axis in response to the movement in the first direction of the separation shaft 63.

As illustrated in FIG. 11, the first frame 15 also has a first support groove 151 recessed in the third direction. The first support groove 151 supports one end portion in the third direction of the first developing guide roller 17. Specifically, the one end portion in the third direction of the first developing guide roller 17 is inserted in the first support groove 151. Accordingly, the first developing guide roller 17 is supported by the first frame 15 so as to be rotatable about the first axis.

Figure 12:
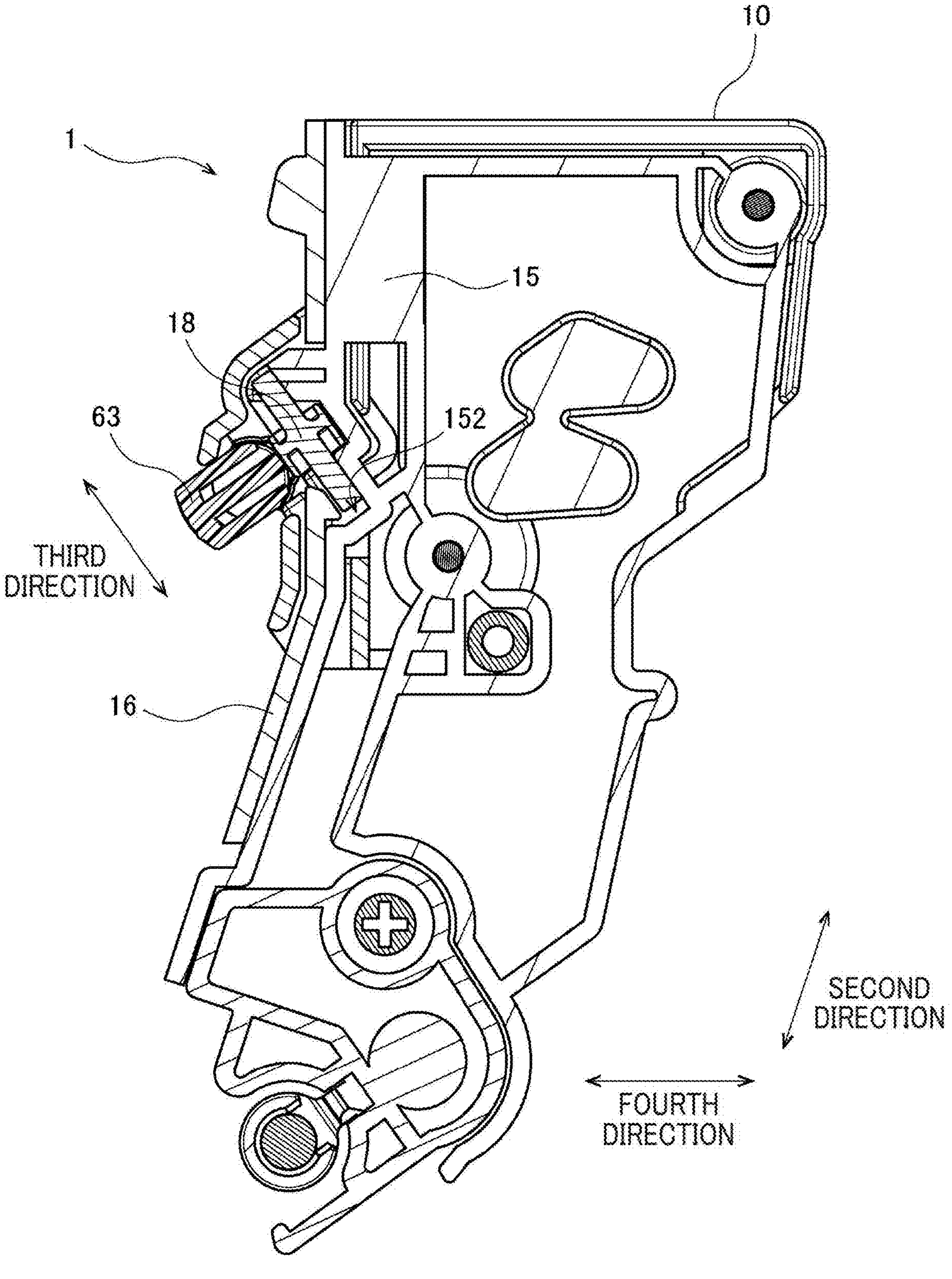
FIG. 12 is a cross-sectional view of the developing cartridge taken along line XII-XII in FIG. 4.

FIG. 12 is a cross-sectional view of the developing cartridge 1 taken along line XII-XII in FIG. 4. As illustrated in FIGS. 10 and 12, the first frame 15 of the casing 10 also includes a second developing guide roller 18. The second developing guide roller 18 is positioned at the other end portion in the first direction of the first frame 15. That is, the first developing guide roller 17 and the second developing guide roller 18 are positioned apart from each other in the first direction.

The second developing guide roller 18 is rotatable about a second axis extending in the third direction. The second developing guide roller 18 has a hollow cylindrical outer circumferential surface centered on the second axis. The outer circumferential surface of the second developing guide roller 18 faces the separation shaft 63 in the second direction, and makes contact with the separation shaft 63. The second developing guide roller 18 rotates about the second axis in response to the movement in the first direction of the separation shaft 63.

As illustrated in FIG. 12, the first frame 15 also has a second support groove 152 recessed in the third direction. The second support groove 152 supports one end portion in the third direction of the second developing guide roller 18. Specifically, the one end portion in the third direction of the second developing guide roller 18 is inserted in the second support groove 152. Hence, the second developing guide roller 18 is supported by the first frame 15 so as to be rotatable about the second axis.

3. Structure of Drum Cartridge

Figure 13:
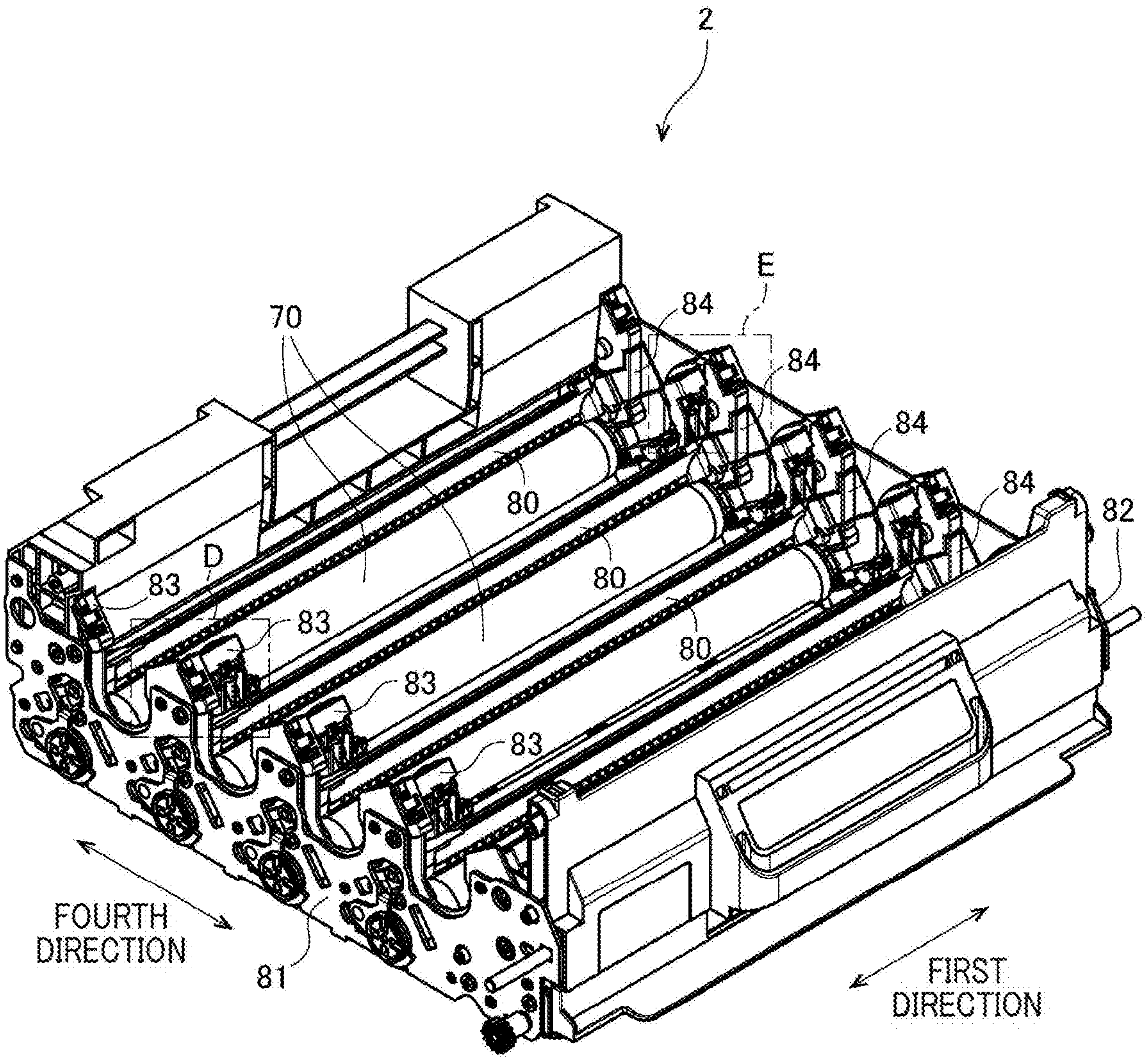
FIG. 13 is a perspective view of a drum cartridge.

FIG. 13 is a perspective view of the drum cartridge 2. As illustrated in FIG. 13, the drum cartridge 2 includes the four photosensitive drums 70, four drum frames 80, a first metal plate 81, a second metal plate 82, the four first side members 83, and four second side members 84.

3-1. Photosensitive Drums

The photosensitive drums 70 are positioned at one end portion in the second direction of the drum cartridge 2. The four photosensitive drums 70 correspond to the respective developing agents of four colors different from one another (for example, yellow, magenta, cyan, and black). The four photosensitive drums 70 are arranged in the fourth direction in the order of, for example, the photosensitive drum 70 for yellow, the photosensitive drum 70 for magenta, the photosensitive drum 70 for cyan, and the photosensitive drum 70 for black. The photosensitive drum 70 for yellow and the photosensitive drum 70 for magenta are arranged to be spaced apart from each other in the fourth direction. The photosensitive drum 70 for magenta and the photosensitive drum 70 for cyan are arranged to be spaced apart from each other in the fourth direction. The photosensitive drum 70 for cyan and the photosensitive drum 70 for black are arranged to be spaced apart from each other in the fourth direction.

Each of the photosensitive drums 70 is supported by the corresponding one of the drum frames 80, and is rotatable about a drum axis extending in the first direction. The photosensitive drum 70 has a hollow cylindrical outer circumferential surface centered on the drum axis. The outer circumferential surface of the photosensitive drum 70 is coated with photosensitive material. When the developing cartridge 1 is attached to the drum cartridge 2, the outer circumferential surface of the developing roller 30 makes contact with the outer circumferential surface of the corresponding photosensitive drum 70.

3-2. Drum Frame

Each of the drum frames 80 supports the corresponding photosensitive drum 70. The four drum frames 80 are arranged in the fourth direction. Of the four drum frames 80, two neighboring drum frames 80 are arranged to be spaced apart from each other in the fourth direction. The drum frames 80 extend in the first direction between the first metal plate 81 and the second metal plate 82. The photosensitive drum 70 has one end portion in the first direction supported by one end portion in the first direction of the corresponding drum frame 80 through a bearing. The photosensitive drum 70 also has another end portion in the first direction supported by another end portion in the first direction of the corresponding drum frame 80 through a bearing. The developing cartridge 1 is attachable to the drum frame 80.

3-3. Metal Plate

The first metal plate 81 supports the one end portions in the first direction of the drum frames 80. The first metal plate 81 has a substantially plate-like shape and extending in both the second direction and the fourth direction. The first metal plate 81 is made of metal such as iron or stainless steel. The first metal plate 81 has a rigidity higher than that of the drum frames 80 and the first side members 83. The first metal plate 81 covers one end portions in first direction of the four drum frames 80. The one end portions in the first direction of the drum frames 80 are fixed to the first metal plate 81.

Further, the drum cartridge 2 includes a first side plate (not illustrated). The first side plate covers an outer surface of the first metal plate 81. The first side plate is fixed to the first metal plate 81.

The second metal plate 82 supports the other end portions in the first direction of the drum frames 80. The second metal plate 82 has a substantially plate-like shape extending in both the second direction and the fourth direction. The second metal plate 82 is made of metal such as iron or stainless steel. The second metal plate 82 has a rigidity higher than that of the drum frame 80 and the second side member 84. The second metal plate 82 covers the other end portions in first direction of the four drum frames 80. The other end portions in the first direction of the drum frames 80 are fixed to the second metal plate 82.

The drum cartridge 2 further includes a second side plate (not illustrated). The second side plate covers an outer surface of the second metal plate 82. The second side plate is fixed to the second metal plate 82.

The four photosensitive drums 70 are positioned between the first metal plate 81 and the second metal plate 82 in the first direction. Further, in a state where the developing cartridges 1 are attached to the drum cartridge 2, the casings 10 of the developing cartridges 1 are positioned between the first metal plate 81 and the second metal plate 82 in the first direction.

3-4. Side Members

The four first side members 83 are positioned at the one end portion in the first direction of the drum cartridge 2. The four first side members 83 are arranged in the fourth direction. Each of the first side members 83 is fixed to an inner surface of the first metal plate 81. Specifically, each of the first side members 83 is fixed to the first metal plate 81 with a screw. Since the first side members 83 are fixed to the first metal plate 81 whose rigidity is higher than that of the first side members 83, displacement of the first side members 83 can be restrained.

Figure 14:
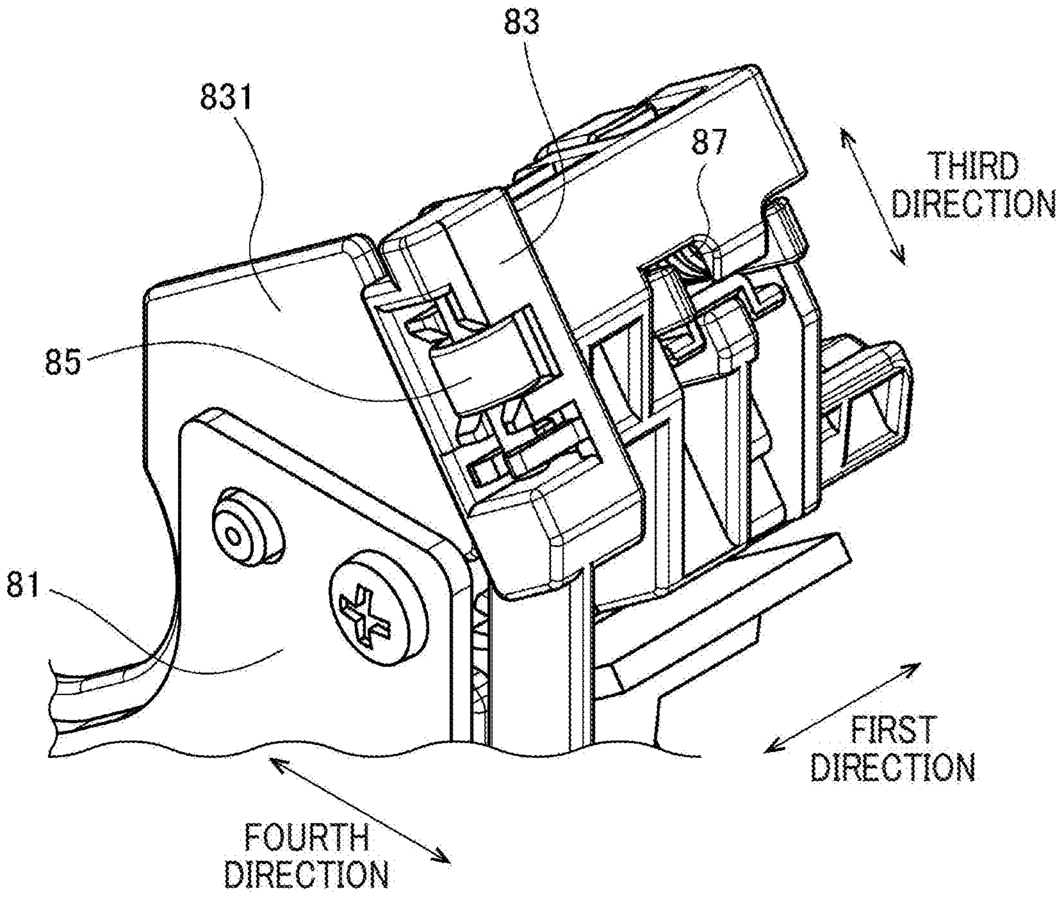
FIG. 14 is an enlarged view of a region D in FIG. 13.

FIG. 14 is an enlarged view of a region D in FIG. 13. As illustrated in FIG. 14, the first side member 83 includes a first plate part 831. The first plate part 831 extends from the first side member 83 in the fourth direction toward the neighboring first side member 83. The first plate part 831 has a distal end portion in the fourth direction inserted between the neighboring first side member 83 and the first metal plate 81. With this structure, deformation of the first side member 83 can be restricted. The first plate part 831 and the neighboring first side member 83 are fixed to the first metal plate 81 by a common screw.

Here, a gap is formed in the first direction between the first plate part 831 and the neighboring first side member 83. Further, a gap is formed in the first direction between the first plate part 831 and the first metal plate 81. Hence, expansion and contraction of the first side member 83 due to change in temperature is allowed.

Further, as illustrated in FIG. 14, the first side member 83 also includes a first drum guide roller 85. The first drum guide roller 85 is rotatable about an axis extending in the third direction. In a state where the developing cartridge 1 is attached to the drum cartridge 2, the first drum guide roller 85 is positioned further outward than the first developing guide roller 17 in the first direction. The first inclined surface 611 of the first cam 61 makes contact with the first drum guide roller 85 when the separation member 60 moves from the first position to the second position in a state where the developing cartridge 1 is attached to the drum cartridge 2. Accordingly, an outer surface of the first drum guide roller 85 serves as an example of "first contacted surface" in the present embodiment.

The four second side members 84 are positioned at the other end portion in the first direction of the drum cartridge 2. The four second side members 84 are arranged in the fourth direction. Each of the second side members 84 is fixed to an inner surface of the second metal plate 82. Specifically, each of the second side members 84 is fixed to the second metal plate 82 with a screw. Since the second side members 84 are fixed to the second metal plate 82 whose rigidity is higher than that of the second side members 84, displacement of the second side members 84 can be restrained.

Figure 15:
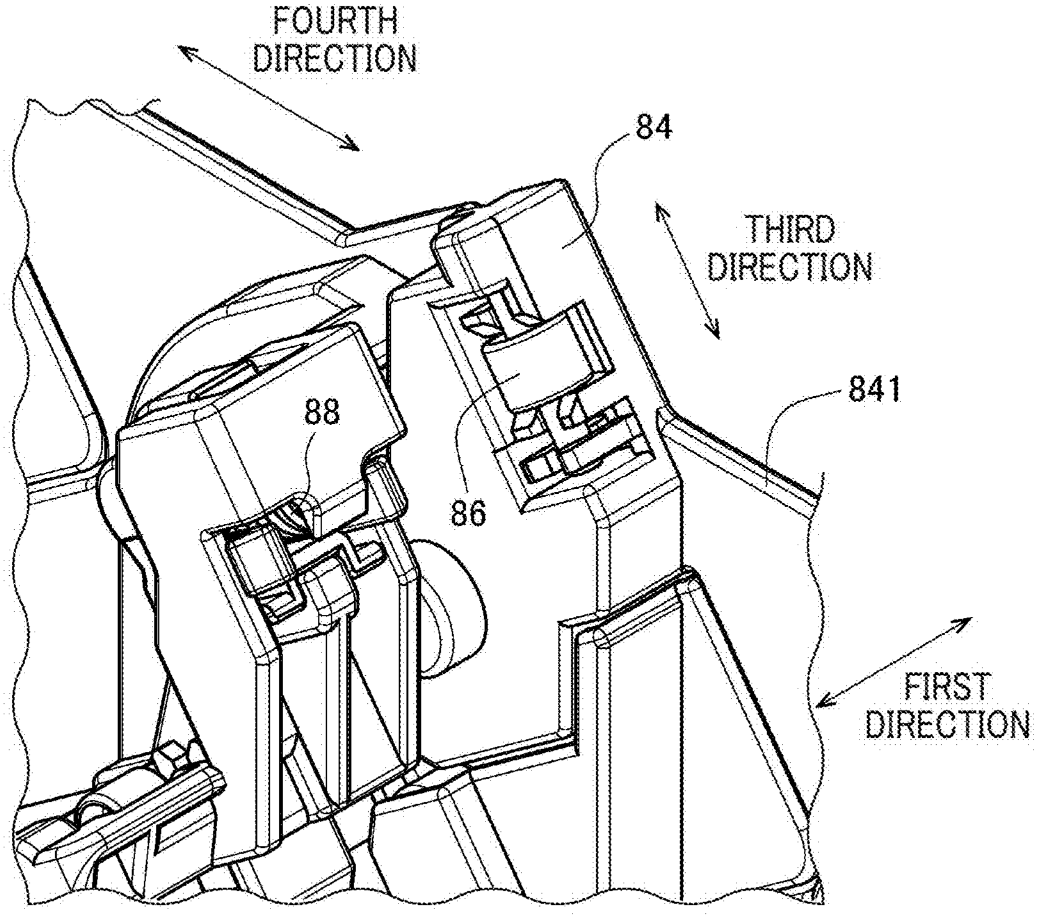
FIG. 15 is an enlarged view of a region E in FIG. 13.

FIG. 15 is an enlarged view of a region E in FIG. 13. As illustrated in FIG. 15, the second side member 84 includes a second plate part 841. The second plate part 841 extends from the second side member 84 in the fourth direction toward the neighboring second side member 84. The second plate part 841 has a distal end portion in the fourth direction inserted between the neighboring second side member 84 and the second metal plate 82. Hence, deformation of the second side member 84 can be restrained. The second plate part 841 and the neighboring second side member 84 are fixed to the second metal plate 82 by a common screw.

A gap is formed in the first direction between the second plate part 841 and the neighboring second side member 84. Further, a gap is formed in the first direction between the second plate part 841 and the second metal plate 82. Accordingly, expansion and contraction of the second side member 84 due to change in temperature is allowed.

Further, as illustrated in FIG. 15, the second side member 84 also includes a second drum guide roller 86. The second drum guide roller 86 is rotatable about an axis extending in the third direction. The first drum guide roller 85 and the second drum guide roller 86 are positioned apart from each other in the first direction. In a state where the developing cartridge 1 is attached to the drum cartridge 2, the second drum guide roller 86 is positioned further outward than the second developing guide roller 18 in the first direction. The second inclined surface 621 of the second cam 62 makes contact with the second drum guide roller 86 when the separation member 60 moves from the first position to the second position in a state where the developing cartridge 1 is attached to the drum cartridge 2. Accordingly, an outer surface of the second drum guide roller 86 serves as an example of "second contacted surface" in the present embodiment.

As illustrated in FIG. 14, the first side member 83 also includes a first developing pressure portion 87. The first developing pressure portion 87 includes an elastic member such as a spring. As illustrated in FIG. 15, the second side member 84 also includes a second developing pressure portion 88. The second developing pressure portion 88 includes an elastic member such as a spring.

The first developing pressure portion 87 and the second developing pressure portion 88 makes contact with the first frame 15 of the developing cartridge 1 when the developing cartridge 1 is attached to the drum cartridge 2. In this state, the first developing pressure portion 87 and the second developing pressure portion 88 urge the developing cartridge 1 toward the photosensitive drum 70 in the second direction, whereby the developing roller 30 makes contact with the photosensitive drum 70. That is, the developing roller 30 reaches the contacting position described above.

4. Separating Operation

Figure 16:
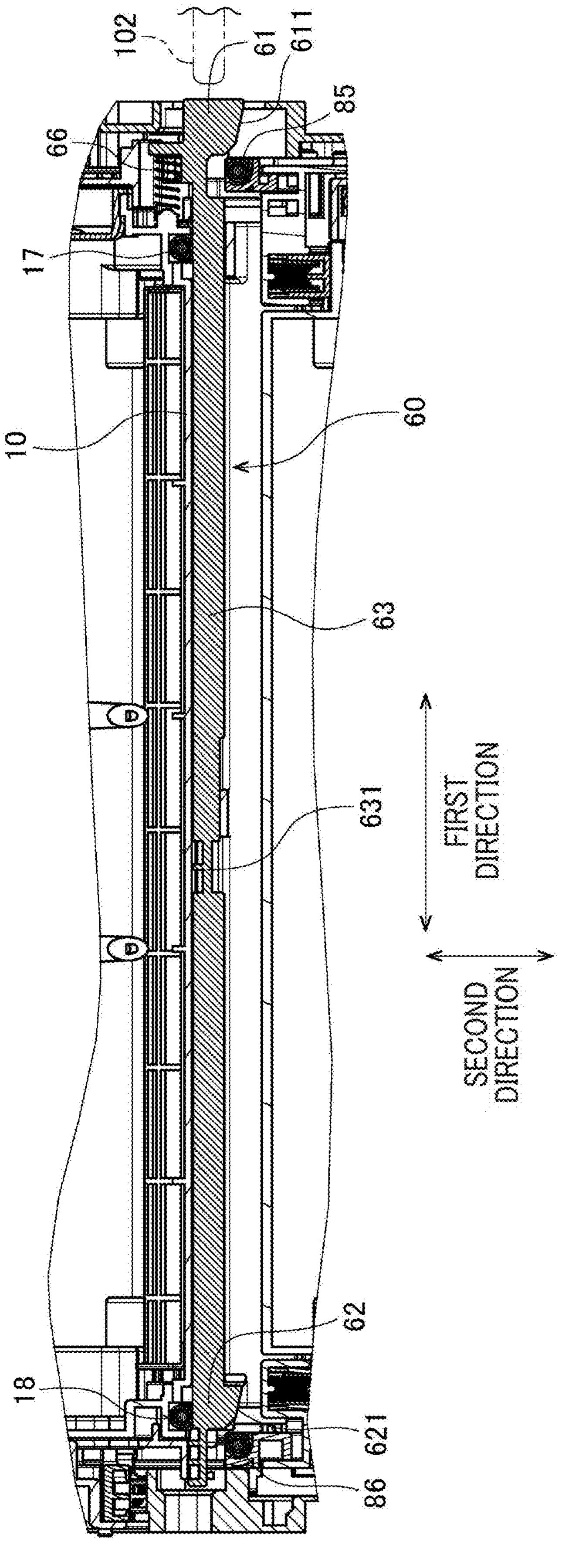
FIG. 16 is a cross-sectional view of the drum cartridge to which the developing cartridge is attached taken along the separation member.
Figure 17:
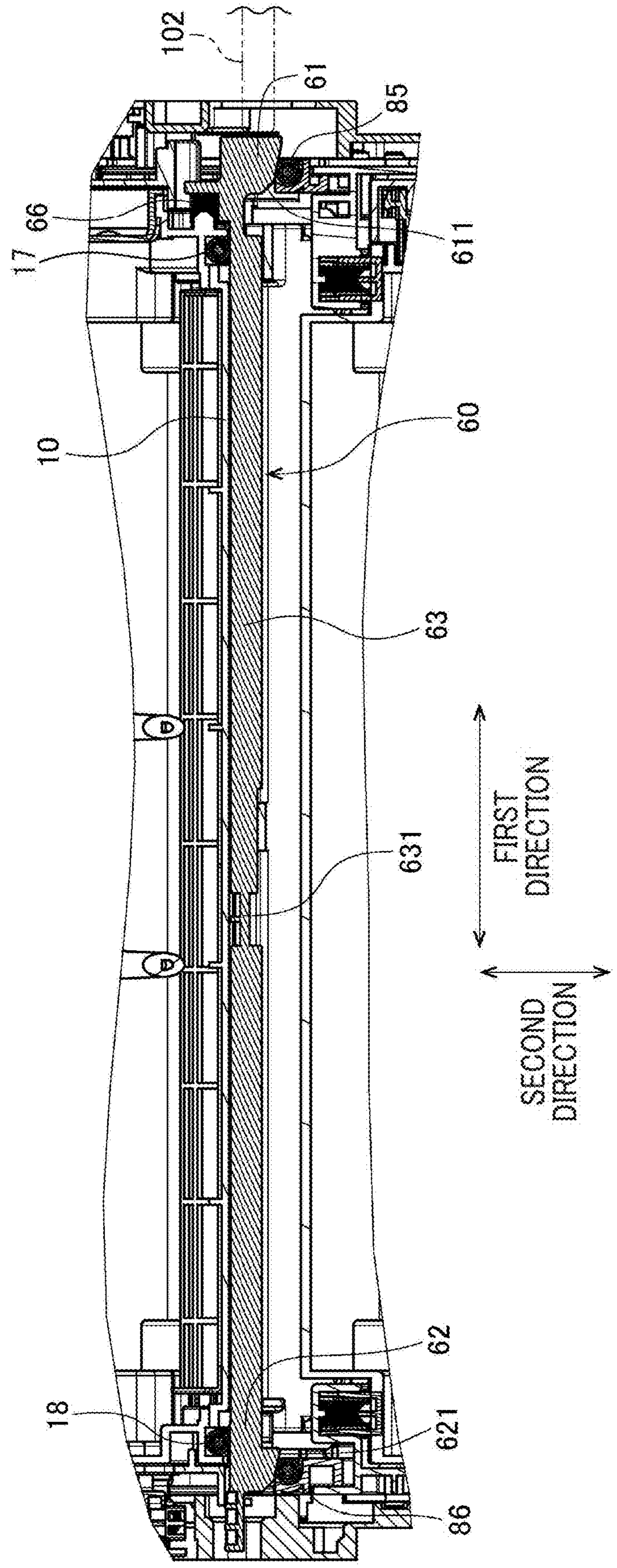
FIG. 17 is another cross-sectional view of the drum cartridge to which the developing cartridge is attached taken along the separation member.

Next, the separating operation performed in the image forming apparatus 100 will be described. FIGS. 16 and 17 are cross-sectional views of the drum cartridge 2 to which the developing cartridge 1 is attached taken along the separation member 60. FIG. 16 illustrates a state where the separation member 60 is positioned at the first position and the separating operation is not performed. FIG. 17 illustrates a state where the separation member 60 is positioned at the second position and the separating operation is being performed.

As illustrated in FIGS. 16 and 17, the image forming apparatus 100 includes the pressure shafts 102. Each of the pressure shafts 102 faces the first cam 61 of the corresponding developing cartridge 1 in the first direction in a state where the drum cartridge 2 having the four developing cartridges 1 attached thereto are attached to the main frame 101.

The pressure shaft 102 is movable in the first direction between a retracted position (a position illustrated in FIG. 16) and a protruding position (a position illustrated in FIG. 17) in which the pressure shaft 102 is positioned closer to the developing cartridge 1 than the pressure shaft 102 at the retracted position is to the developing cartridge 1. In order to perform the separating operation in the image forming apparatus 100, the pressure shaft 102 moves from the retracted position to the protruding position and makes contact with the first cam 61. The pressure shaft 102 presses the separation member 60 in the direction from the first cam 61 to the second cam 62 in the first direction. Therefore, the return spring 66 is compressed and thus the separation member 60 moves in the first direction from the first position to the second position relative to the casing 10.

In accordance with the movement of the separation member 60 from the first position to the second position, the first inclined surface 611 of the first cam 61 moves in the first direction while the first inclined surface 611 maintains contact with the first drum guide roller 85 of the drum cartridge 2. The first drum guide roller 85 rotates in accordance with the movement in the first direction of the first inclined surface 611. At this time, the first cam 61 moves in the second direction relative to the drum cartridge 2 due to a reaction force from the first drum guide roller 85. Specifically, the first cam 61 moves relative to the drum cartridge 2 in a direction away from the photosensitive drum 70 by the reaction force applied from the first drum guide roller 85.

Similarly, in accordance with the movement of the separation member 60 from the first position to the second position, the second inclined surface 621 of the second cam 62 moves in the first direction while the second inclined surface 621 maintains contact with the second drum guide roller 86 of the drum cartridge 2. The second drum guide roller 86 rotates in accordance with the movement in the first direction of the second inclined surface 621. At this time, the second cam 62 moves in the second direction relative to the drum cartridge 2 by a reaction force from the second drum guide roller 86. Specifically, the second cam 62 moves relative to the drum cartridge 2 in the direction away from the photosensitive drum 70 by the reaction force applied from the second drum guide roller 86.

In this way, the casing 10 and the developing roller 30 move together with the separation member 60 in the second direction relative to the drum cartridge 2. Specifically, the casing 10 and the developing roller 30 move in the direction away from the photosensitive drum 70 relative to the drum cartridge 2. As a result, the developing roller 30 moves in the second direction from the contacting position in which the developing roller 30 is in contact with the photosensitive drum 70 to the separated position in which the developing roller 30 is in separation from the photosensitive drum 70.

The separation shaft 63 makes contact with the first developing guide roller 17 and the second developing guide roller 18. Hence, the first developing guide roller 17 and the second developing guide roller 18 receive a load directed in the second direction from the separation shaft 63 during the separating operation. As such, in the present embodiment, an outer surface (the outer circumferential surface) of the first developing guide roller 17 and an outer surface (the outer circumferential surface) of the second developing guide roller 18 serve as "load receiving surface" configured to receive a load directed in the second direction from the separation shaft 63.

With such a structure, of the first frame 15 and the second frame 16 that constitute the casing 10, the first frame 15 that supports the developing roller 30 includes the first developing guide roller 17 and the second developing guide roller 18. Hence, the first frame 15 that supports the developing roller 30 receives a load directed in the second direction from the separation shaft 63 during the separating operation. This structure allows the developing roller 30 to move accurately in the second direction relative to the drum cartridge 2 regardless of accuracy in fixing of the first frame 15 and the second frame 16, and accuracy in dimension of the second frame 16.

There remains a minute looseness between the first frame 15 and the second frame 16 even when the first frame 15 and the second frame 16 are fixed to each other with high accuracy. Also, the second frame 16 has a minute dimensional tolerance even when the second frame 16 is formed accurately. Assuming that the separation shaft 63 presses the second frame 16 during the separating operation, the movement in the second direction of the separation shaft 63 is transmitted to the developing roller 30 through the second frame 16 and the first frame 15. In this case, an amount of movement of the developing roller 30 may vary depending on the looseness and the dimensional tolerance described above.

In contrast, the movement in the second direction of the separation shaft 63 is transmitted to the developing roller 30 through the first frame 15 without intervening the second frame 16, since the separation shaft 63 presses the first frame 15 during the separating operation as described above. Consequently, the amount of the movement of the developing roller 30 is not affected by the looseness and the dimensional tolerance described above, whereby the developing roller 30 can accurately move in the second direction relative to the drum cartridge 2.

Particularly, according to the present embodiment, the outer surface of the first developing guide roller 17 functioning as the "load receiving surface" rotates in response to the movement in the first direction of the separation shaft 63, and the outer surface of the second developing guide roller 18 also functioning as the "load receiving surface" rotates in response to the movement in the first direction of the separation shaft 63. With this structure, frictional resistance due to the movement of the separation shaft 63 relative to the first frame 15 can be lowered, thereby accurately moving the separation shaft 63 in the first direction relative to the casing 10.

Further, the load directed in the second direction from the separation shaft 63 is received by the two parts, i.e., the first developing guide roller 17 and the second developing guide roller 18 positioned apart from each other in the first direction. Hence, the developing roller 30 can accurately move relative to the photosensitive drum 70 while restraining inclination of the developing cartridge 1 relative to the drum cartridge 2.

5. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

5-1. First Modification

Figure 18:
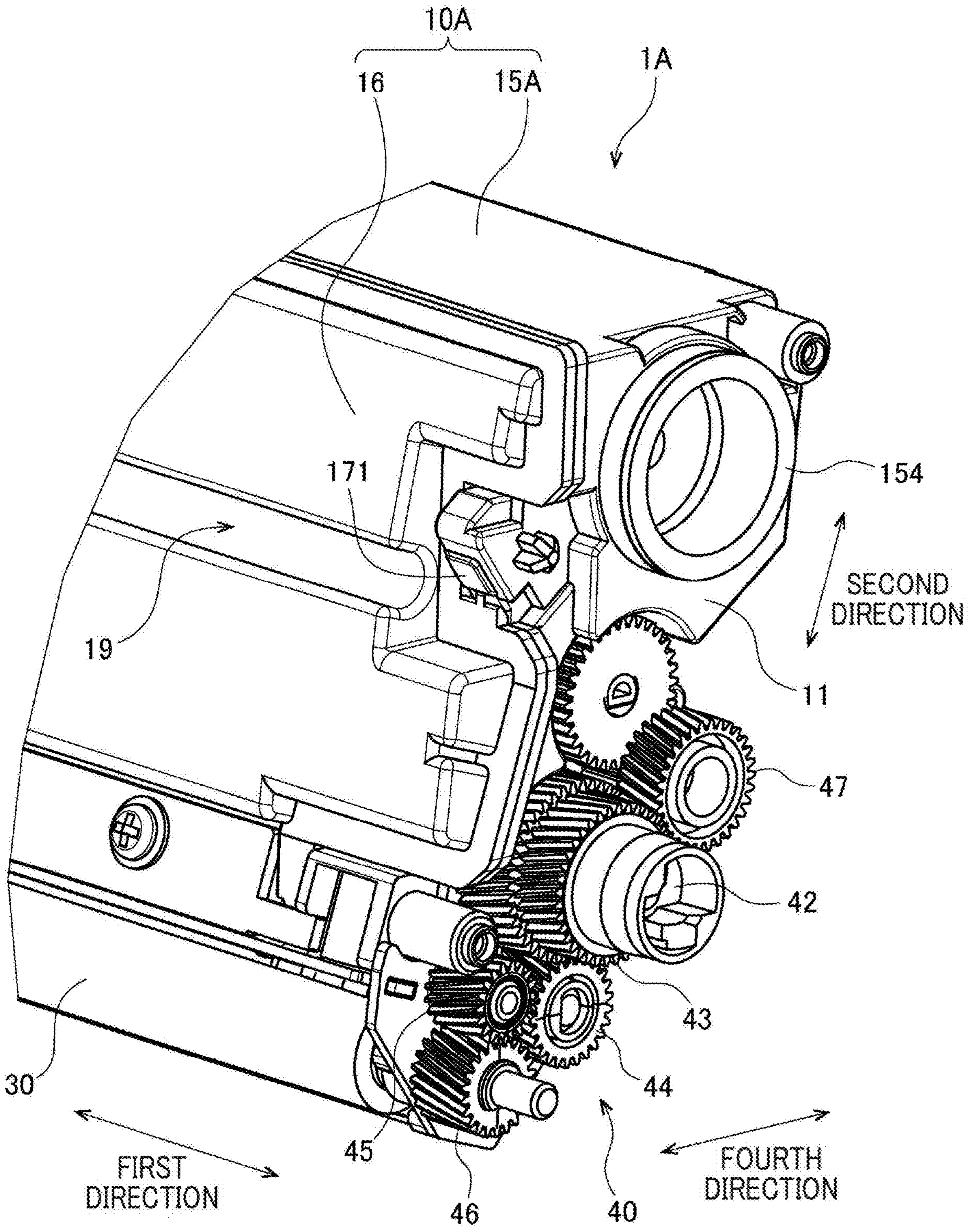
FIG. 18 is a partial perspective view of a developing cartridge in which the gear cover and the separation member are detached therefrom.

FIG. 18 is a partial perspective view of a developing cartridge 1A according to a first modification, and illustrating a state where the gear cover 41 and the separation member 60 are omitted. The developing cartridge 1A according to the first modification includes a casing 10A configured of a first frame 15A supporting the developing roller 30, and the second frame 16. In the first modification, the first frame 15A has a load receiving surface 171. The load receiving surface 171 is not an outer surface of a roller, but an outer surface of the first frame 15A. The load receiving surface 171 faces the separation shaft 63 in the second direction. The load receiving surface 171 receives the load directed in the second direction from the separation shaft 63 during the separating operation.

Even with such a structure, the first frame 15A supporting the developing roller 30 receives the load directed in the second direction at the time of the separating operation. Hence, the developing roller 30 can accurately move in the second direction relative to the photosensitive drum 70 irrespective of the accuracy in fixing between the first frame 15A and the second frame 16 and the accuracy in dimension of the second frame 16.

5-2. Second Modification

In the above-described embodiment, each first side member 83 of the drum cartridge 2 includes the first drum guide roller 85, and the outer surface of the first drum guide roller 85 functions as the "first contacted surface" that makes contact with the first cam 61 during the separating operation. Similarly, each second side member 84 of the drum cartridge 2 includes the second drum guide roller 86, and the outer surface of the second drum guide roller 86 functions as the "second contacted surface" that makes contact with the second cam 62 during the separating operation. With such a structure, frictional resistance generated due to the movement of the separation member 60 relative to the first side member 83 and the second side member 84 can be lowered.

Alternatively, the "first contacted surface" may be an outer surface of the first side member 83 other than the outer surface of the roller. Also, the "second contacted surface" may be an outer surface of the second side member 84 other than the outer surface of the roller.

5-3. Other Modifications

In the above-described embodiment, the developing cartridge 1 includes the first developing guide roller 17 and the second developing guide roller 18. That is, the developing cartridge 1 has two "load receiving surfaces". However, the developing cartridge may include only one developing guide roller, or may include greater than or equal to three developing guide rollers. That is, the developing cartridge 1 may have only one load receiving surface, or may have greater than or equal to three load receiving surfaces.

In the above-described embodiment, the drum cartridge 2 includes the first drum guide roller 85 and the second drum guide roller 86. That is, the drum cartridge 2 has two "contacted surfaces" that makes contact with the separation member 60 during the separating operation for each developing cartridge 1. However, as a modification, the drum cartridge 2 may include only one drum guide roller, or may include greater than or equal to three drum guide rollers for each developing cartridge 1. That is, the drum cartridge 2 may have only one contacted surface, or may have greater than or equal to three contacted surfaces for each developing cartridge 1.

In the above-described embodiment, the separation member 60 has the first inclined surface 611 and the second inclined surface 621. However, the second inclined surface 621 may be omitted.

In the above-described embodiment, the casing 10 of the developing cartridge 1 includes the first rib 191 and the second rib 192. Alternatively, the casing 10 may include only one of the first rib 191 and the second rib 192. Further, both the first rib 191 and the second rib 192 may be omitted from the casing 10.

In the above-described embodiment, the four developing cartridges 1 are attachable to the drum cartridge 2. However, the drum cartridge 2 may be modified to receive one through three developing cartridges 1, or greater than or equal to five developing cartridges 1.

Note that detailed shapes and structures of the developing cartridge and the image forming apparatus may be suitably modified without departing from the scope of the present disclosure. Further, the parts and the components appearing in the above-described embodiment and modifications may be employed or omitted as appropriate as long as any contradiction is avoided.

What is claimed is:

1. A developing cartridge comprising:

a developing roller rotatable about a developing axis extending in a first direction, the developing roller including a developing roller shaft extending in the first direction;

a casing configured to accommodate developing agent therein, the casing having one end portion and another end portion spaced apart from the one end portion in the first direction;

a supply roller rotatable about a supply axis extending in the first direction, the supply roller including a supply roller shaft extending in the first direction;

an agitator rotatable about an agitator axis extending in the first direction, the agitator including an agitator shaft extending in the first direction;

a coupling rotatable about a coupling axis extending in the first direction, the coupling being positioned at the one end portion of the casing, the coupling including a coupling gear;

a developing roller gear coupled to one end of the developing roller shaft, the developing roller gear being positioned at the one end portion of the casing;

a supply roller gear coupled to one end of the supply roller shaft, the supply roller gear being positioned at the one end portion of the casing, the supply roller gear being in meshing with the coupling gear;

an agitator gear coupled to one end of the agitator shaft, the agitator gear being positioned at the one end portion of the casing;

a first idle gear rotatable about a first idle axis extending in the first direction, the first idle gear being positioned at the one end portion of the casing, the first idle gear being in meshing with the supply roller gear and the developing roller gear;

a second idle gear rotatable about a second idle axis extending in the first direction, the second idle gear being positioned at the one end portion of the casing, the second idle gear being in meshing with the coupling gear and the agitator gear; and an electrical contact surface positioned at the another end portion of the casing.

2. The developing cartridge according to claim 1, wherein the coupling gear includes a first gear portion which is in meshing with the second idle gear and a second gear portion which is in meshing with the supply roller gear, and wherein the second idle gear includes a first gear portion which is in meshing with the first gear portion of the coupling gear and a second gear portion which is in meshing with the agitator gear.

3. The developing cartridge according to claim 1, wherein the casing includes a cap which is configured to close a filling port, the cap being positioned at the one end portion of the casing.

4. The developing cartridge according to claim 3, wherein the cap is positioned farther away from the developing roller than the agitator gear is from the developing roller in a second direction.

5. The developing cartridge according to claim 3, wherein the cap is positioned farther away from the another end portion of the casing than the supply roller gear, the first idle gear, the developing roller gear, and the agitator gear are from the another end portion of the casing in the first direction.

6. The developing cartridge according to claim 1, wherein a part of the agitator gear is overlapped with the second idle gear in the first direction.

7. The developing cartridge according to claim 1, further comprising a holder positioned at the another end portion of the casing, the holder holding the electrical contact surface, the holder being movable relative to the casing.

8. The developing cartridge according to claim 1, further comprising a gear cover attached to the one end portion of the casing, the gear cover covering the coupling gear, the developing roller gear, the supply roller gear, the agitator gear, the first idle gear, and the second idle gear.

9. The developing cartridge according to claim 8, wherein the coupling is exposed to an outside of the casing through the gear cover.

* * * * *